US012087116B2

(12) United States Patent
Im et al.

(10) Patent No.: US 12,087,116 B2
(45) Date of Patent: Sep. 10, 2024

(54) SECURITY CHECK FOR AUTONOMOUS VEHICLE METHOD AND SYSTEM

(71) Applicant: NAVER LABS CORPORATION, Seongnam-si (KR)

(72) Inventors: Ye Sook Im, Seongnam-si (KR); Hyeon Cheol Lee, Seongnam-si (KR); Da Gyeong Lee, Seongnam-si (KR)

(73) Assignee: NAVER CORPORATION, Gyeonggi-do (KR)

( * ) Notice: Subject to any disclaimer, the term of this patent is extended or adjusted under 35 U.S.C. 154(b) by 201 days.

(21) Appl. No.: 17/514,187

(22) Filed: Oct. 29, 2021

(65) Prior Publication Data

US 2022/0148358 A1 May 12, 2022

(30) Foreign Application Priority Data

Nov. 12, 2020 (KR) ........................ 10-2020-0150892

(51) Int. Cl.
*G07C 9/32* (2020.01)
*G07C 9/10* (2020.01)

(52) U.S. Cl.
CPC ..................................... *G07C 9/32* (2020.01); *G07C 9/10* (2020.01)

(58) Field of Classification Search
CPC .................................... G07C 9/10; G07C 9/32
See application file for complete search history.

(56) References Cited

U.S. PATENT DOCUMENTS

| | | | | |
|---|---|---|---|---|
| 6,707,374 | B1 * | 3/2004 | Zaharia | B66B 1/468 340/5.31 |
| 2009/0057068 | A1 * | 3/2009 | Lin | B66B 1/34 187/392 |
| 2010/0078266 | A1 * | 4/2010 | Choi | B66B 1/2466 187/382 |
| 2017/0213456 | A1 * | 7/2017 | Finschi | G08G 1/149 |
| 2021/0179385 | A1 * | 6/2021 | Calisi | G06Q 50/265 |

FOREIGN PATENT DOCUMENTS

| | | | |
|---|---|---|---|
| JP | 2006-132233 | A | 5/2006 |
| JP | 6519867 | B2 | 5/2019 |
| KR | 10-2017-0017169 | A | 2/2017 |
| KR | 10-2018-0011751 | A | 2/2018 |
| KR | 10-2018-0065105 | A | 6/2018 |
| KR | 10-2020-0062284 | A | 6/2020 |
| KR | 10-2020-0069841 | A | 6/2020 |

* cited by examiner

*Primary Examiner* — Daniell L Negron
(74) *Attorney, Agent, or Firm* — Harness, Dickey & Pierce, P.L.C.

(57) ABSTRACT

Security check methods and systems over a user on a vehicle may be provided. The security check method including checking an allowed security right to a destination of a vehicle for entry, detecting a security right of a user on the vehicle, and performing a security process related to getting off the vehicle, based on the security right of the user and the allowed security right may be provided.

19 Claims, 16 Drawing Sheets

FIG. 6

| | BUILDING | ALLOWED SECURITY RIGHT | | | | |
|---|---|---|---|---|---|---|
| | | FIRST TYPE | SECOND TYPE | THIRD TYPE | FOURTH TYPE | FIFTH TYPE |
| 610 | A-1 | ENTRY ALLOWED | ENTRY PROHIBITED | ENTRY PROHIBITED | ENTRY ALLOWED | ENTRY PROHIBITED |
| | A-2 | ENTRY ALLOWED | ENTRY PROHIBITED | ENTRY ALLOWED | ENTRY PROHIBITED | ENTRY PROHIBITED |
| | A-3 | ENTRY PROHIBITED | ENTRY PROHIBITED | ENTRY PROHIBITED | ENTRY ALLOWED | ENTRY PROHIBITED |
| 620 | B-1 | ENTRY ALLOWED | ENTRY ALLOWED | ENTRY ALLOWED | ENTRY ALLOWED | ENTRY ALLOWED |
| | B-2 | ENTRY ALLOWED | ENTRY PROHIBITED | ENTRY PROHIBITED | ENTRY PROHIBITED | ENTRY ALLOWED |
| | C-1 | ENTRY ALLOWED | ENTRY ALLOWED | ENTRY PROHIBITED | ENTRY PROHIBITED | ENTRY PROHIBITED |
| | C-2 | ENTRY ALLOWED | ENTRY PROHIBITED | ENTRY ALLOWED | ENTRY PROHIBITED | ENTRY PROHIBITED |
| 630 | C-3 | ENTRY ALLOWED | ENTRY ALLOWED | ENTRY PROHIBITED | ENTRY ALLOWED | ENTRY PROHIBITED |

FIG. 7

| DESTINATION | ALLOWED SECURITY RIGHT | COMMON ALLOWED SECURITY RIGHT |
|---|---|---|
| A-1 | FIRST AND FOURTH TYPES | FIRST TYPE<br>FOURTH TYPE |
| B-1 | FIRST TO FIFTH TYPES | |
| C-3 | FIRST, SECOND AND FOURTH TYPES | |

SECURITY CHECK FOR AUTONOMOUS VEHICLE METHOD AND SYSTEM

CROSS-REFERENCE TO RELATED APPLICATION

Pursuant to 35 U.S.C. § 119(a), this application claims the benefit of the earlier filing date and the right of priority to Korean Patent Application No. 10-2020-0150892, filed on Nov. 12, 2020, the contents of which is incorporated by reference herein in its entirety.

BACKGROUND

1. Technical Field

Example embodiments relate to a security check methods and/or systems over a user who has got on a vehicle.

2. Description of the Related Art

A security area requiring a control of entry, a security check for a user who is to enter the security area is necessary. Recently, a housing complex (e.g., an apartment complex), a research complex, a business complex, or the like is operated as a security complex where a security check over a user who is to enter the corresponding complex (or a specific building located at the corresponding complex) is performed, due to various reasons such as public safety and technology leakage.

In such a security area, it is necessary to perform a security check for checking whether a user has an entry right (interchangeably referred to as an entry privilege) to a corresponding complex or a specific building.

Meanwhile, methods to perform a security check over a user may vary. As a representative example, there is a method to allow entry after checking whether a user has an entry right or not, by checking an identity of the user by a security inspector. However, in this case, it takes time and labor for the security check, because the security inspector should check the user's identity one by one.

Accordingly, various attempts for automation of a security check have been made. For instance, a method to control user's entry using an open or closed state of a speed gate has been disclosed.

However, in this method, there exists inconvenience to perform a security check even over a user having an entry right one by one. Accordingly, there still exist needs to more efficiently perform a security check.

SUMMARY

Therefore, some example embodiments of the present disclosure provide a security check methods and/or systems capable of reducing or minimizing user's inconvenience, which may occur to a user due to a security check.

More specifically, some example embodiments of the present disclosure provide security check methods and/or systems capable of performing a security check only when there exists a user desiring a control of entry.

Some example embodiments of the present disclosure provide security check methods and/or systems capable of performing a new type of security check.

More specifically, some example embodiments of the present disclosure provide security check methods and/or systems capable of performing a security check over a user, within a vehicle.

In order to achieve these and other advantages and in accordance with the purposes of this disclosure, as embodied and broadly described herein, there is provided a security check method in a vehicle which is configured to run along a driving path including at least one destination. The method may include checking an allowed security right to the destination for entry, detecting a security right of a user on the vehicle, and performing a security process related to getting off the vehicle, based on the security right of the user and the allowed security right.

There is also provide a security check system, which may include a sensor configured to sense user information on a user on a vehicle, and a controller configured to detect a security right of the user by using the user information, wherein the controller is further configured to perform a security process related to getting off the vehicle, based on the security right of the user and an allowed security right to the destination for entry.

There is also provide a vehicle, which may include a door having one of an open state and a closed state, a camera configured to capture an inner space of the vehicle, and a controller configured to detect a facial image of a user on the vehicle from an image captured by the camera and configured to detect a security right of the user matched with the facial image from a user database, wherein in a case that a specific user, from among a plurality of users, who does not satisfy an allowed security right to the destination for entry exists, the controller is configured to perform a security process for restricting getting-off of the specific user by controlling an open or closed state of the door unit.

There is also provide a non-transitory computer-readable record medium storing a program thereon, which when executed by one or more processors, causes a computer to implement a security check method, the security check method comprising checking an allowed security right to a destination included in a driving path of a vehicle for entry, detecting a security right of a user on the vehicle, and performing a security process related to getting off the vehicle, based on the security right of the user and the allowed security right.

Further, in the security check method and system according to some example embodiments, a security check over a user may be performed in the vehicle, and only a user having an entry right to a specific complex or building may be allowed to get off, based on a result of the security check. In some example embodiments, a security check over a user may be performed while the user is moving by vehicle, and only a user having an entry right is allowed to get off. This may allow the specific complex or building to omit a security check over the user who has got off the vehicle. Like this, in the security check method and system according to some example embodiments, as a security check over a user is performed in the vehicle, it may not be needed to provide additional workers and/or facilities for a user's security check at each specific complex or building. That is, according to some example embodiments, because a security check over a user is performed through the vehicle, security checks at a plurality of different complexes or buildings may be performed within the single vehicle. Thus, a maximum efficiency of the security check may be improved with construction of a relatively light infrastructure for security check.

BRIEF DESCRIPTION OF THE DRAWINGS

FIGS. 6, 7 and 8 are conceptual views for explaining a security right according to some example embodiments;

DETAILED DESCRIPTION

Figure 1:
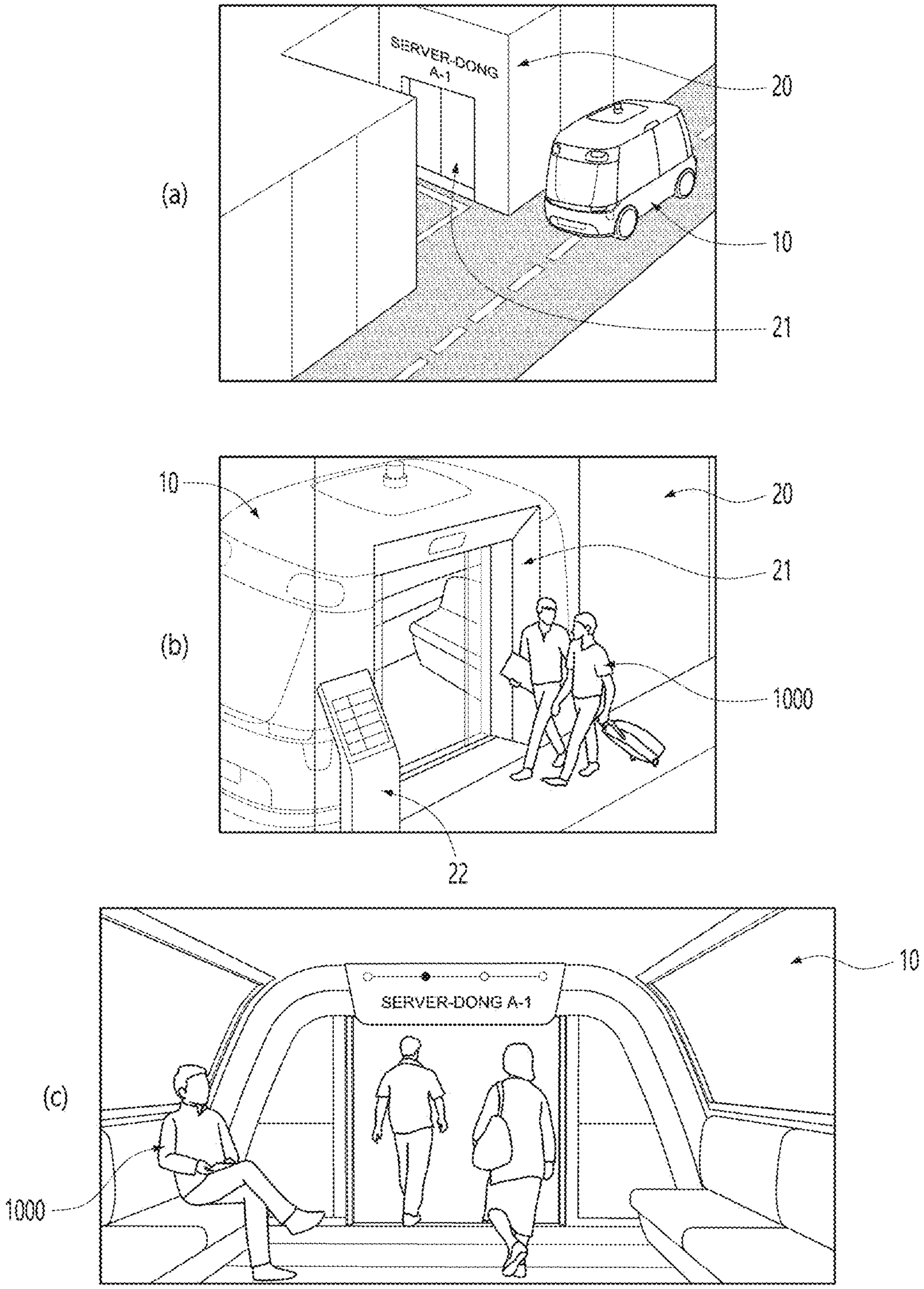
FIG. 1 is a conceptual view for explaining a security check method and system according to an example embodiment.

Description will now be given in detail according to some example embodiments disclosed herein, with reference to the accompanying drawings. For the sake of brief description with reference to the drawings, the same or equivalent components may be provided with the same or similar reference numbers, and description thereof will not be repeated. In general, a suffix such as “module” and “unit” may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those that are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being “connected with” another element, the element can be connected with the other element or intervening elements may also be present. In contrast, when an element is referred to as being “directly connected with” another element, there are no intervening elements present.

A singular representation may include a plural representation unless it represents a definitely different meaning from the context.

Terms such as “include” or “has” are used herein and should be understood that they are intended to indicate an existence of features, numbers, steps, functions, several components, or combinations thereof, disclosed in the specification, and it is also understood that greater or fewer features, numbers, steps, functions, several components, or combinations thereof may likewise be utilized. Expressions such as “at least one of,” when preceding a list of elements, modify the entire list of elements and do not modify the individual elements of the list.

The present disclosure relates to security check methods and/or systems capable of performing a new type of security check, and more particularly proposes methods and/or systems capable of performing a security check over a user in a vehicle.

In the present disclosure, a “security check (or a security process)” may mean a check whether a user who has got on a vehicle has a security right to enter a destination of the vehicle.

Here, the destination of the vehicle may be understood to include stops included in a driving path of the vehicle. The destination of the vehicle may be a building or an area positioned at a location where the vehicle has stopped. Like this, the destination of the vehicle may be interpreted as various meanings. For instance, the destination of the vehicle may mean a building such as an apartment or an office. As another example, the destination of the vehicle may be understood as a specific area categorized conceptually, such as a housing complex, a commercial complex and a business complex. In the present disclosure, for convenience, all of a specific building and a specific area will be expresses as “a destination” or “a destination of a vehicle” without division.

Meanwhile, a specific building or a specific area corresponding to a destination of a vehicle may be operated to allow only a user having a desired (or alternatively, preset) entry right to enter, according to a necessity of an operator. That is, in order for a user to enter a destination, an entry right possessed by the user should satisfy an entry right (interchangeably referred to as an entry privilege) desired to enter the destination. Throughout this disclosure, the words “right” and “privilege” are used interchangeably.

In the present disclosure, the “entry right desired to enter a destination” will be referred to as an “allowed security right”.

The allowed security right to a destination is not limited to a range to control only entrance to the destination. That is, the allowed security right may include a range to control usage of data that can access a specific area or a specific building corresponding to a destination, usage of accessible facilities, and taking-out data.

In the present disclosure, an entry right possessed by a user will be referred to as a “security right”.

Likewise, the user’s security right is not limited to a range to control only entry to a destination. That is, the user’s security right may include a range of information accessible at a specific area or a specific building corresponding to a destination, and a range of usable facilities.

Figure 2:
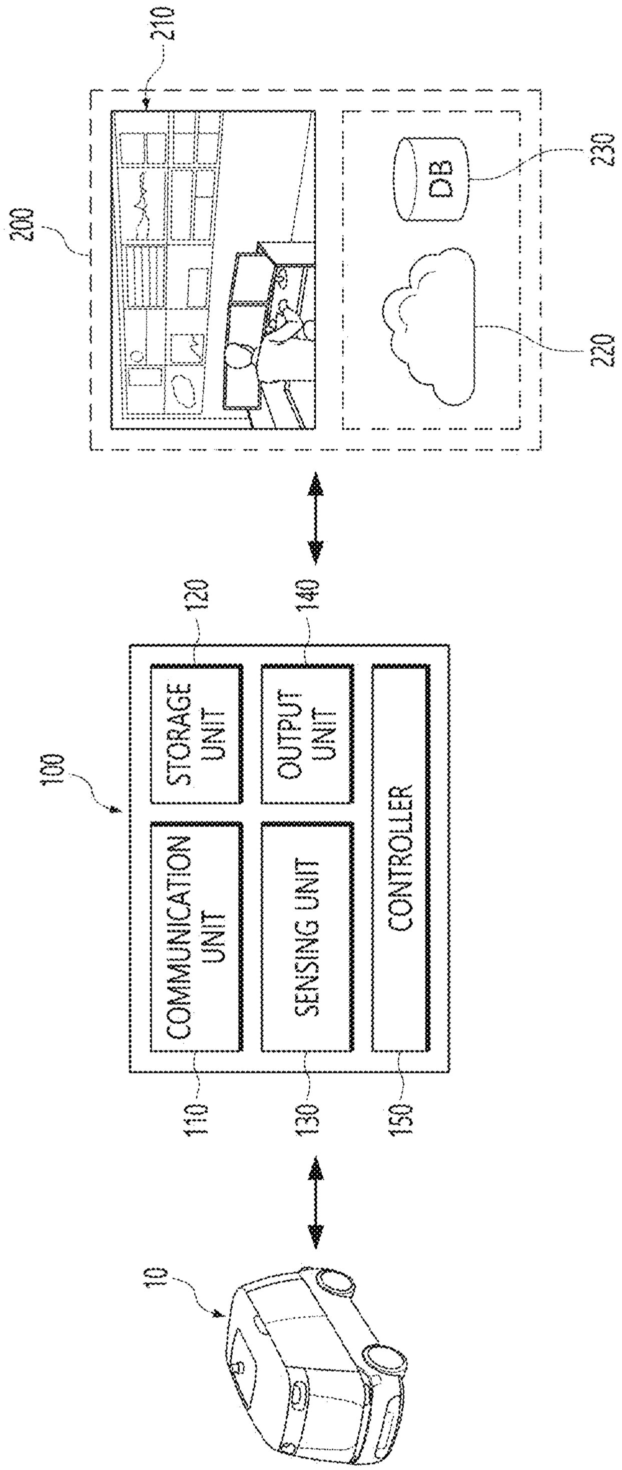
FIG. 2 is a conceptual view for explaining a security check system according to an example embodiment.
Figure 3:
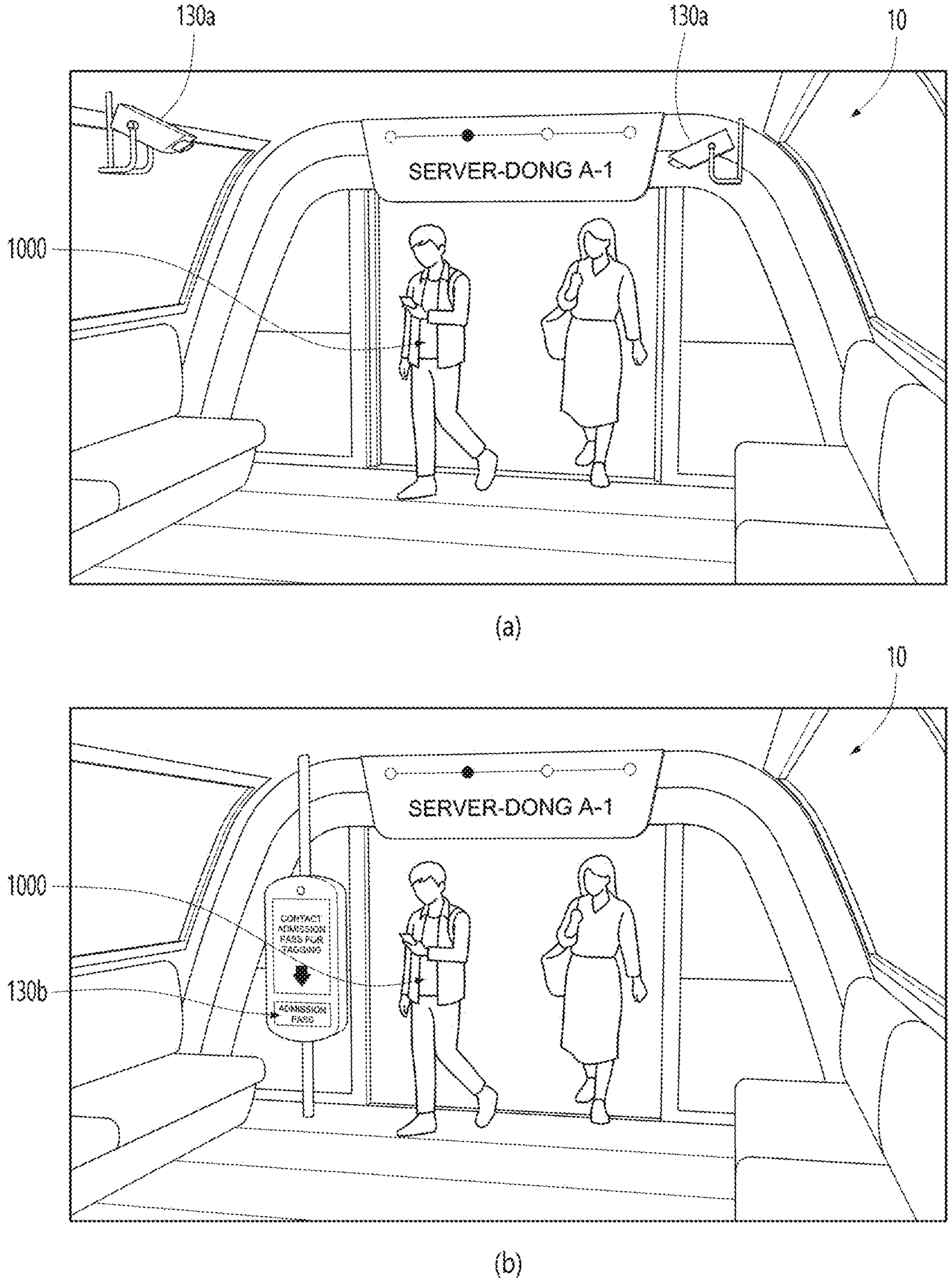
FIGS. 3 and 4 are conceptual views for explaining a vehicle in which a security check according to an example embodiment is performed.
Figure 4:
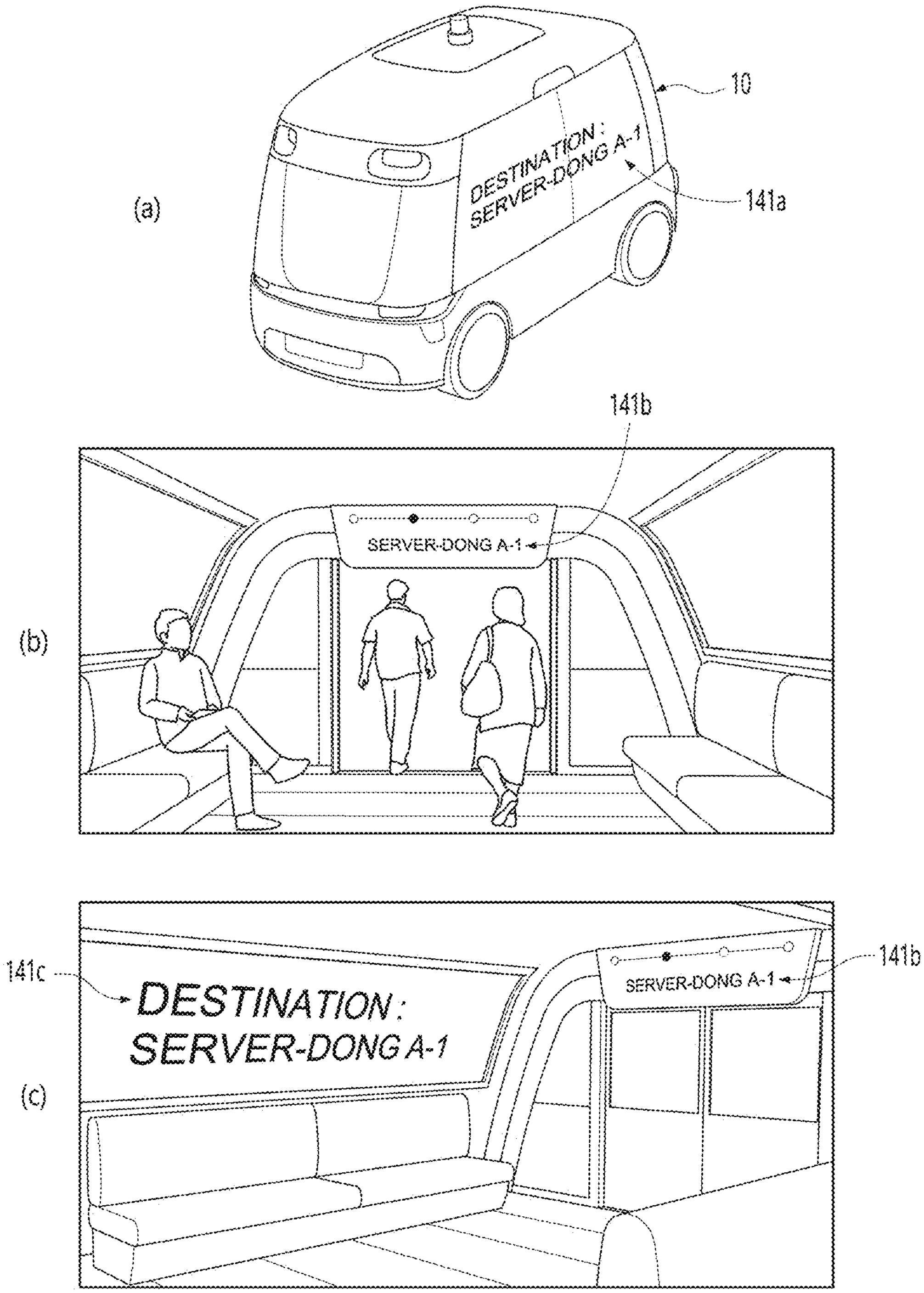

In the present disclosure, a security check over a user may be performed by checking an allowed security right to a destination included in a driving path of a vehicle, and then by determining whether a security right of the user who is an object to get off the vehicle satisfies the allowed security right to the destination where the user wishes to get off. In the present disclosure, such a security check is performed within a vehicle. Hereinafter, a security check method with respect to a user within a vehicle will be explained in more detail with reference to the attached drawings. FIG. 1 is a conceptual view for explaining a security check method and system according to an example embodiment. FIG. 2 is a conceptual view for explaining a security check system according to an example embodiment. FIGS. 3 and 4 are conceptual views for explaining a vehicle in which a security check according to an example embodiment is performed.

Firstly, FIG. 1(*a*) shows a vehicle 10 and a destination 20 (SERVER-DONG A-1). The word “DONG” is a phonetic translation of the Korean word for a building. In the present disclosure, the vehicle 10 is a transportation means for a user (a person), and has no disclosure on its type.

Here, the vehicle 10 may be an autonomous (land) vehicle or an unmanned vehicle. Such an autonomous vehicle may mean an automobile that can drive automatically without a user's driving. In an example embodiment, the vehicle 10 may be an autonomous vehicle that can drive (run) automatically along a desired (or alternatively, preset) driving path.

Further, the vehicle 10 according to an example embodiment may mean a vehicle driven by a human. The vehicle 10 driven by a human may also move along a driving path desired (or alternatively, preset) by a human.

Meanwhile, the vehicle 10 according to an example embodiment may be configured to drive along a driving path including at least one destination 20. The driving path of the vehicle 10 may be determined by a user 1000 who is to get on the vehicle 10, as shown in FIG. 1(*b*).

In order to get on the vehicle 10, the user 1000 may input destination information through an electronic device 22 provided at a boarding spot (getting-on spot) 20. In an example embodiment, the boarding spot 20 may be the destination 20, and thus the same reference numeral 20 is used.

The electronic device 22 or a central controller that manages the electronic device 22 may provide, to the electronic device 22, information on a vehicle (e.g., identification information of the vehicle) that the user 1000 should get on in order to arrive at a corresponding destination, based on destination information received from the user 1000 through the electronic device 22.

Through this, the user may recognize which vehicle he or she has to get on in order to move to a desired destination. Thus, as shown in FIG. 1(*c*), the user 1000 may get on the vehicle 10 including the user's desired destination in a driving path.

Meanwhile, the electronic device 22 or the central controller may generate a driving path of the vehicle 10, based on destination information received from the user 1000 through the electronic device 22.

That is, the vehicle 10 may drive along a driving path including at least one destination, and such a driving path may be variably changed according to a destination inputted from the user.

Further, the driving path of the vehicle 10 may be determined in advance per vehicle. In this case, the electronic device 22 or the central controller may specify the vehicle 10 having a driving path that includes the destination inputted from the user 1000. The electronic device 22 or the central controller may provide searched information of the vehicle 10 (e.g., identification information of the vehicle) to the electronic device 22.

Meanwhile, each destination explained in the present disclosure may have the same or a different allowed security right for entry. Accordingly, when selections for destinations are received from a plurality of users, the central controller may provide information on vehicles where the users should get on, such that the users having the same or similar security rights get on the same vehicle. In this case, the central controller may check the user's security right by sensing user's information through the electronic device 22.

Meanwhile, the vehicle 10 according to an example embodiment may be controlled in an interworking manner with a building 20 corresponding to the destination 20 (the same reference numeral 20 with the destination is used). For instance, a door (e.g., an entrance door (not shown)) of the vehicle 10 may be operated in an interworking manner with a door (or an entrance door 21) of the building 20. For instance, as shown in FIG. 1(*b*), the vehicle 10 may stop around the building (or the destination 20) such that the door of the vehicle 10 faces the door 21 of the building 20. In this case, as shown in FIGS. 1(*b*) and (*c*), users may get on the vehicle 10 or get off the vehicle 20 only when both the door of the vehicle 10 and the door 21 of the building 20 are open.

Like this, in an example embodiment, as the vehicle 10 and the building 20 are controlled in an interworking manner, a user may immediately enter the building 20 through the vehicle 10.

In an example embodiment, a driving path of the vehicle 10 may include at least one of a plurality of buildings included in a specific complex as a destination. In this case, the vehicle 10 may be understood as a shuttle bus of a company, a school, a research institute, an apartment, etc.

Such a specific complex may be operated by the same operator. Further, a plurality of buildings included in the specific complex may allow only a user who satisfies a desired (or alternatively, preset) allowed security right to enter, as desired by an operator.

Here, determining whether a user has a security right that satisfies an allowed security right or not may be performed in the vehicle 10. Hereinafter, a security check system 100 capable of performing a security check in the vehicle 10 will be explained.

As shown in FIG. 2, the security check system 100 according to an example embodiment may include a communication unit 110, a storage unit 120, a sensing unit (e.g., a sensor) 130, an output unit 140 and a controller 150. At least a part of the security check system 100 of the example embodiment may be provided in the vehicle 10. A security check of the example embodiment may be performed by using at least one component of the security check system 100 that constitutes the vehicle 10. Further, the security check system 100 can be included in a control system (not shown) of the vehicle 10. Hereinafter, the components of the security check system 100 and the vehicle 10 will be explained without division. That is, at least a part of the components of the security check system 100 may be understood to have the same configuration as the components of the vehicle, and may be understood to control the components of the vehicle.

Hereinafter, at least one component of the security check system 100 will be explained in more detail.

Firstly, the communication unit 110 may be configured to perform at least one of a wired communication and a wireless communication. The communication unit 110 may be configured to perform communications with various objects. Here, the objects which communicate with the communication unit 110 may be greatly variable, and may be, for example, a component of the vehicle 10, a component of the security check system 100, a user's electronic device, a central controller (a central control system, or a control system 210) which manages the security check system 100, a control system which manages or controls the building 20, and various electronic devices provided at the building 20.

Furthermore, the communication unit 110 may be configured to communicate with at least one external server. Here, the external server may be configured to include at least one of a cloud server 220 and a database 230, as shown. Meanwhile, the external server may be configured to perform at least a part of the controller 150. In other words, performance such as data processing or data computation can be performed on the external server, and example embodiments do not impose any particular restrictions on this approach.

Meanwhile, the communication unit 110 may support a variety of communication methods according to a communication specification of a device with which it communicates.

For instance, the communication unit 110 may be configured to communicate using at least one of WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced), 5G (5th Generation Mobile Telecommunication), Bluetooth™, RFID (Radio Frequency Identification), IrDA (Infrared Data Association), UWB (Ultra-Wideband), ZigBee, NFC(Near Field Communication), Wi-Fi Direct, and Wireless USB (Wireless Universal Serial Bus).

Further, the communication unit 110 can communicate with a sensor for obtaining position information of the vehicle 10. The sensor (module) for obtaining position information of the vehicle 10 may have various types. For instance, the sensor may be at least one of various sensors such as a GPS (Global Positioning System) module, a DGPS (Differential Global Positioning System) module, a magnetic-based or vision-based lane recognition module, and a camera sensor for recognizing a plurality of visual tags. Further, in example embodiments, the sensor for obtaining position information of the vehicle 10 does not have any limitations on type, and various types of sensors may be utilized only if position information of the vehicle 10 can be obtained.

Next, the storage unit 120 may be configured to store various information related to example embodiments. In an example embodiment, the storage unit 120 may be equipped at the security check system 100 itself. In contrast, at least a part of the storage unit 120 may mean at least one of the cloud server 220 and the database 230. That is, it can be understood that the storage unit 120 may have any form as long as it stores desired information for a security check according to example embodiments, and thus there is no constraint on physical space. Thus, the storage unit 120, the cloud server 220 and the database 230 may not be separately identified, but all are described as the storage unit 120. Here, the cloud server 220 may mean “cloud storage”.

Next, the sensing unit 130 may be configured to sense (or collect) information on a user who has got on the vehicle 10. The sensing unit 130 may be formed as various means to sense information on the user 1000. For instance, as shown in FIG. 3, the sensing unit 130 may include a camera 130*a* provided at the vehicle 10. In this case, the information on the user 1000 may be a user image captured by the camera 130*a*.

Further, as shown in FIG. 3(*b*), the sensing unit 130 may include a scan unit (or a recognition unit 130*b*) for scanning or recognizing an identification mark possessed by the user 1000. Here, the identification mark of the user 1000 may include a configuration that can be recognized through communication, such as an antenna (e.g., an NFC antenna), a barcode, a QR code, etc. Such an identification mark may be configured as an access card, etc. to enter a specific company, a specific building, an apartment, etc. Such an access card may be configured as various means such as an entry pass, an employee card, a resident card, or a visitor’s nametag.

The scan unit 130*b* may be configured to scan information corresponding to the identification mark by locating the identification mark near the scan unit 130*b*. The identification mark may include information on the user 1000 who has the identification mark, and the scanned information or information matched with the scanned information may be user information of the user 1000.

Further, the sensing unit 130 may sense information on the user 1000 by using at least one of various means. For instance, the sensing unit 130 may include a sensing means (e.g., a fingerprint recognition unit and an iris recognition unit) for sensing bio information of the user 1000.

Next, the output unit 140 is configured to output various information related to the security check system 100 according to an example embodiment. The output unit 140 may be configured as a component for outputting information in one of tactile, audible, and visible manners.

The output unit 140 may include a display unit to output visual information. Such a display unit may be provided at least one of inside and outside the vehicle 10.

For instance, as shown in FIG. 4(*a*), a display unit 141*a* may be located outside the vehicle 10. In this case, users situated outside the vehicle 10 may recognize information on the vehicle 10.

As another example, as shown in FIG. 4(*b*), a display unit 141*b* may be located inside the vehicle 10. In this case, users situated inside the vehicle 10 may recognize information on the vehicle 10.

As still another example, as shown in FIG. 4(*c*), a display unit 141*c* may be configured as a transparent display unit (e.g., a transparent display) 141*c* having a light transmittance. In this case, the display unit 141*c* may serve as both a window of the vehicle 10 and a display.

Further, besides the aforementioned examples, the display unit may be configured in various manners. For instance, the display unit may be configured as a flexible display.

Although not shown, the security check system 100 of an example embodiment may further include an input unit. The input unit may be a medium between a user (or a manager) and the security check system 100.

Here, there are no specific restrictions on the type of the input unit, and the input unit may include at least one of mechanical input means (e.g., mechanical keys, a mouse, a joystick, physical buttons, a dome switch, a jog wheel, and a jog switch) and touch-type input means. For example, the touch-type input means may be a virtual key, a soft key, or a visual key that is displayed on a touch screen through software processing, or may be a touch key that is placed outside of the touch screen. Meanwhile, the virtual key or the visual key can be displayed on the touch screen in various forms, for example, graphics, texts, icons, videos, or a combination thereof. Here, when the input unit includes a touch screen, the aforementioned display unit may be configured as the touch screen. In this instance, the display unit may perform both roles of information output and information reception.

Next, the controller 150 may be configured to control the overall operations of the security check system 100 related to an example embodiment. The controller 150 may process signals, data, information, etc. that are input or output through the components shown above, or provide or process appropriate information or functions to the user.

For example, the controller 150 may perform a security check according to an example embodiment by sensing information on a user who has got on the vehicle 10, through the sensing unit 130.

For example, the controller 150 may check a security right of a user who has got on the vehicle, based on the user’s information sensed through the sensing unit 130. Then, the controller 150 may determine whether the user has been allowed to enter the destination based on the checked user's security right and an allowed security right to a destination included in a driving path of the vehicle 10. For example, the controller 150 may compare the checked user's security right with an allowed security right to a destination included in a driving path of the vehicle 10, thereby determining whether the user has been allowed to enter the destination. According to a result of the determination, the controller 150 may perform a proper security process.

In an example embodiment, the controller 150 may utilize various means such that only a specific user who satisfies an allowed security right to a destination among users who have got on the vehicle 10, gets off at the destination. For instance, the controller 150 may control the door of the vehicle 10 such that only a specific user gets off at the destination.

Hereinafter, the security check method according to some example embodiments will be explained in more detail with reference to the aforementioned security check system and the attached drawings.

Figure 5:
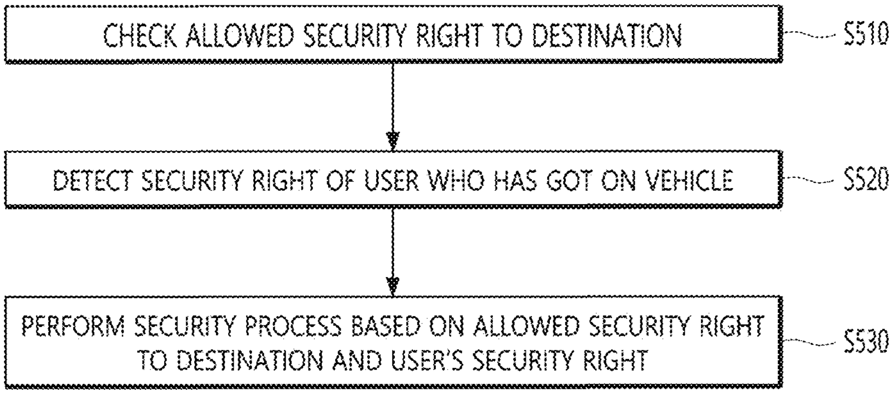
FIG. 5 is a flowchart for explaining a security check method according to an example embodiment.
Figure 8:
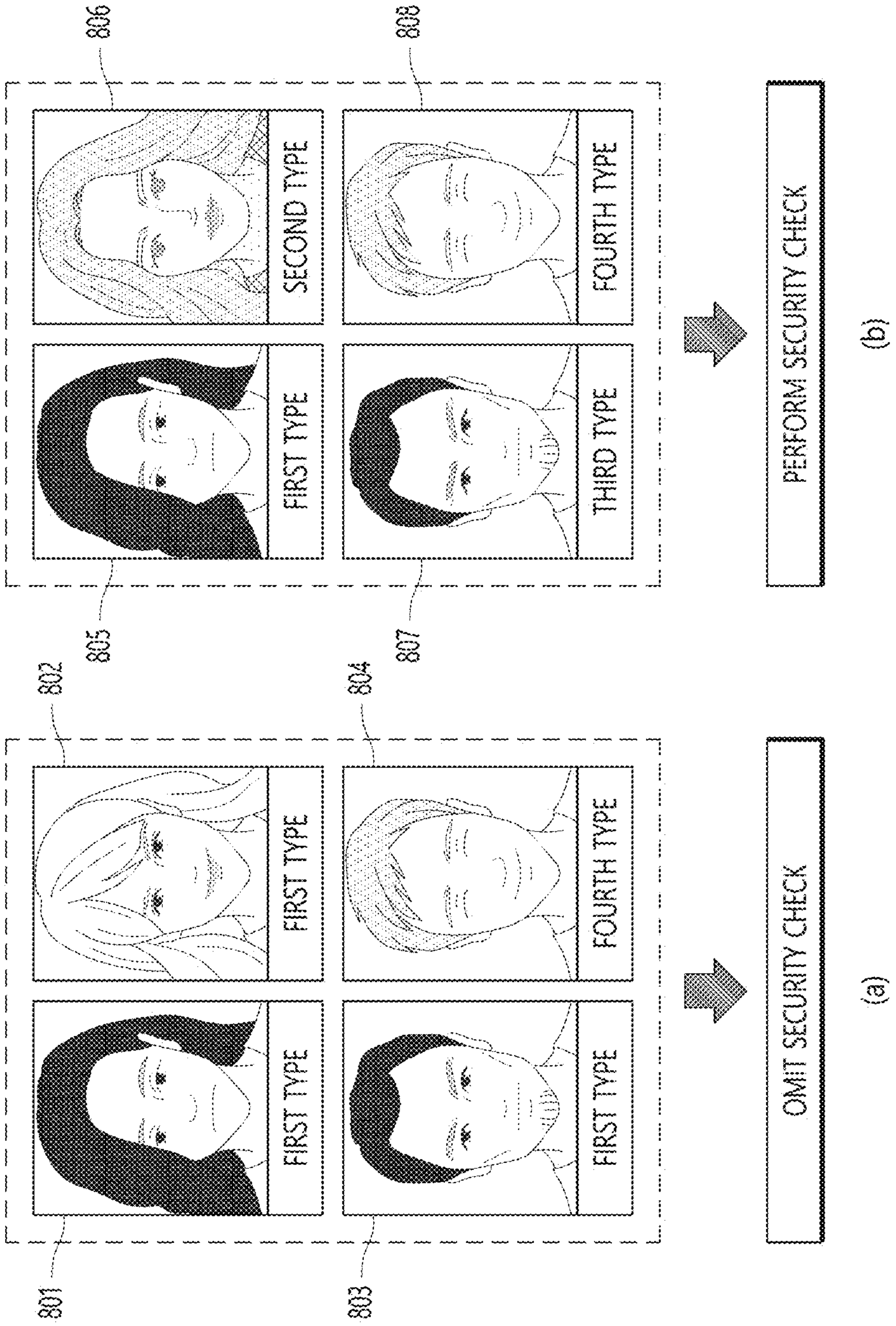
Figure 11:
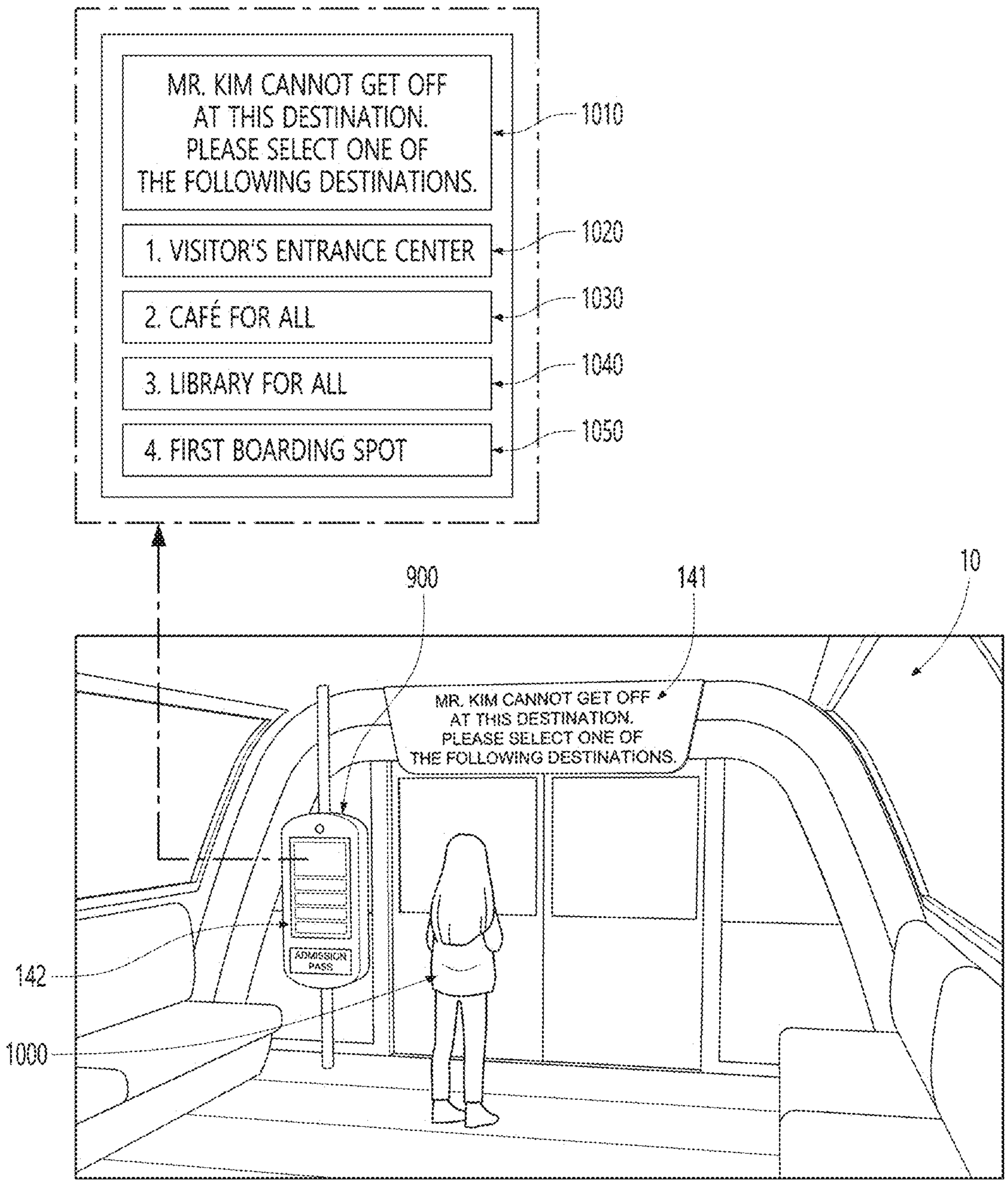
Figure 12A:
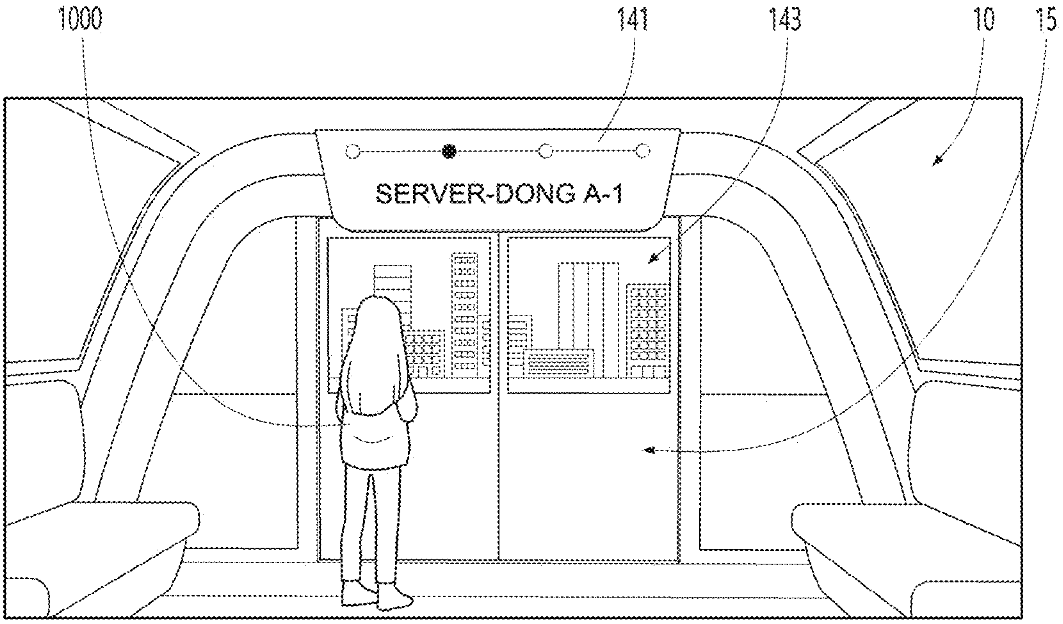
FIGS. 12A, 12B, and 12C are conceptual views for explaining a display unit of a vehicle according to some example embodiments.
Figure 12B:
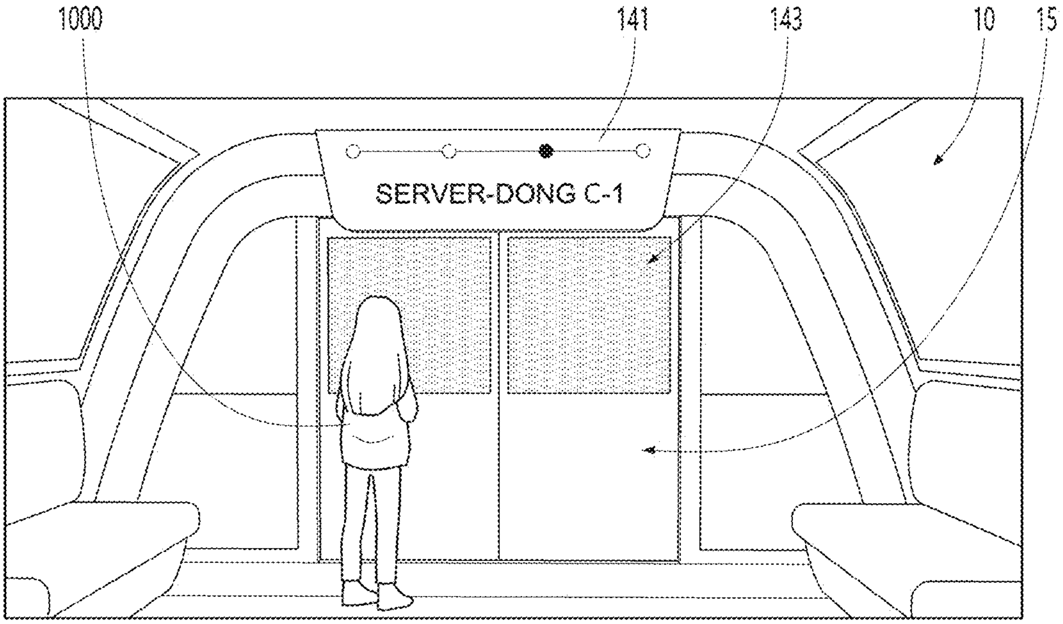
Figure 12C:
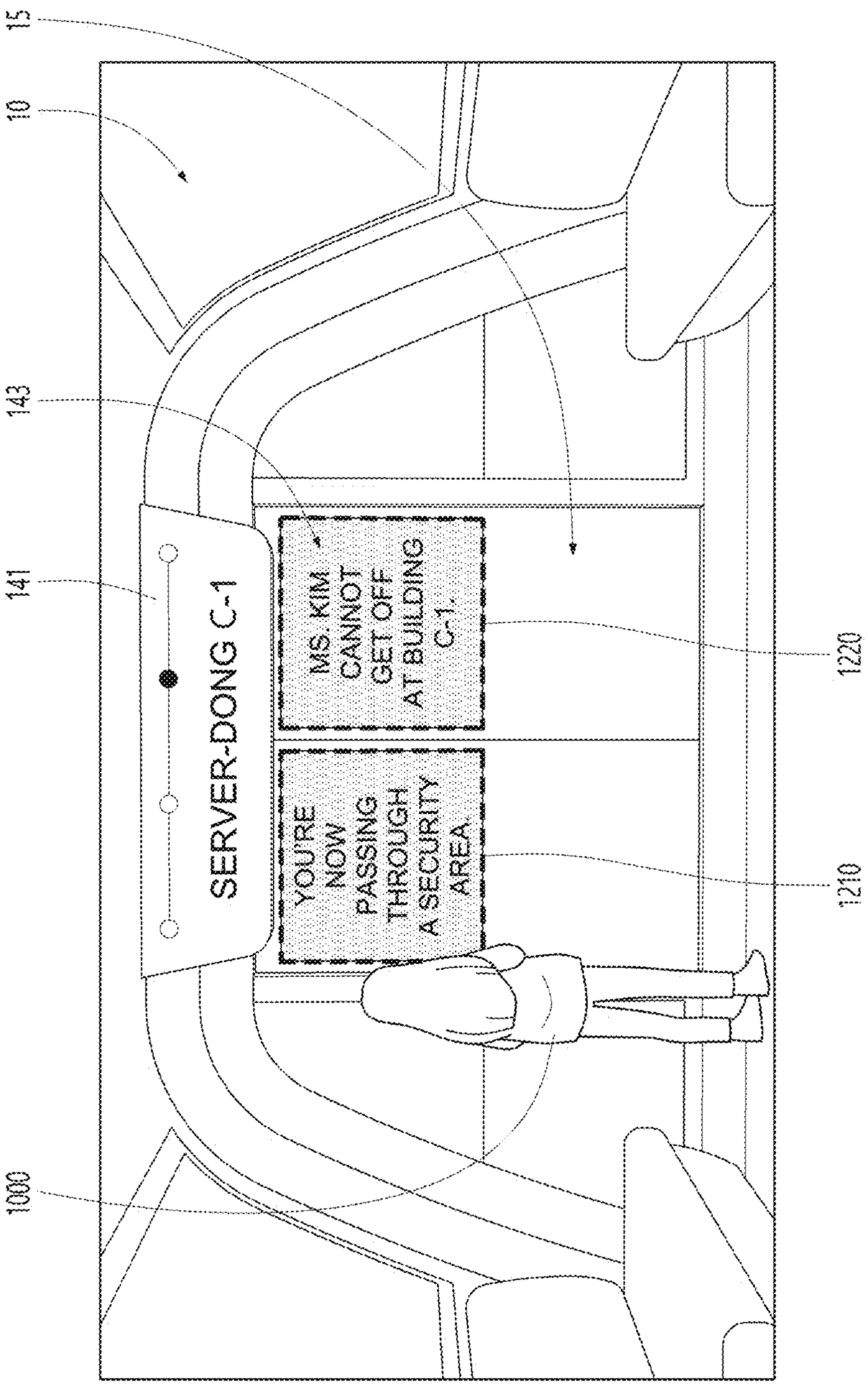
Figure 13:
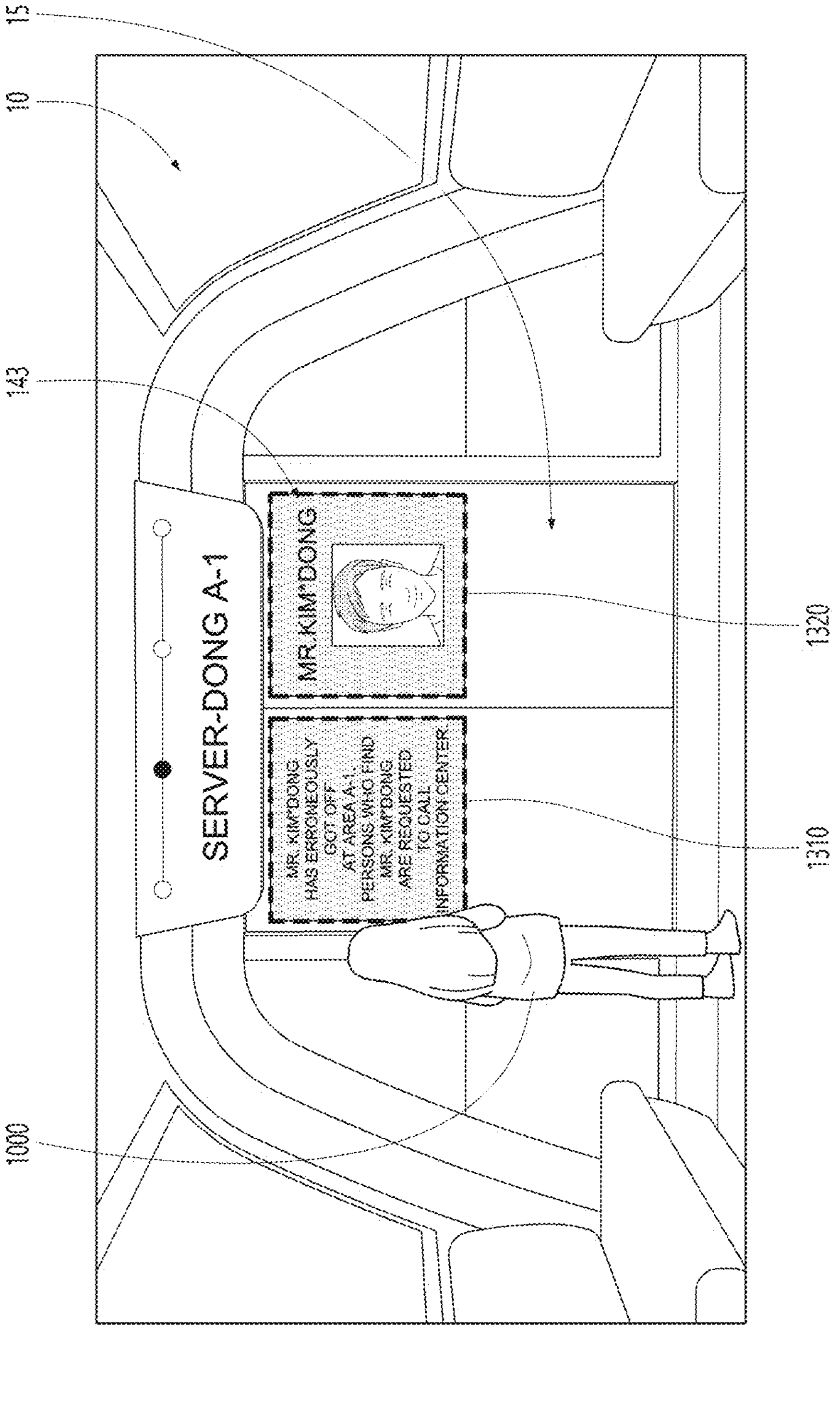
FIG. 13 is a conceptual view for explaining a security process according to an example embodiment.

FIG. 5 is a flowchart for explaining the security check method according to an example embodiment. FIGS. 6, 7 and 8 are conceptual views for explaining a security right according to some example embodiments. FIGS. 9A, 9B, 10A, 10B and 11 are conceptual views for explaining a security process according to some example embodiments. FIGS. 12A, 12B, and 12C are conceptual views for explaining a display unit of the vehicle according to some example embodiments. FIG. 13 is a conceptual view for explaining a security process according to an example embodiment.

As shown in FIG. 5, the security check method according to an example embodiment may include checking an allowed security right to a destination (S510), and detecting (or checking) a security right of a user who has got on a vehicle (S520).

In the example embodiment, the order of S510 and S520 may be switched from each other, or S510 and S520 may be simultaneously performed, as will be explained hereinafter.

Once a driving path of a vehicle is set, the controller 150 may check an allowed security right to a destination, included in the driving path of the vehicle. The number of times or time that the controller 150 checks the allowed security right to a destination included in the driving path may vary. Thus, example embodiments have no restrictions thereon.

As aforementioned, the driving path of the vehicle may be determined by a request of a user who wishes to get in the vehicle, or under control of the controller 150 or a central controller.

In some example embodiments, the driving path of the vehicle may include at least one destination. Further, the vehicle may allow a user who has got on the vehicle to get off at the destination, by stopping at each destination included in the driving path. In the specification, the "user who has got on the vehicle" does not mean a singular number, but may include a concept of a singular number or a plural number.

Each destination explained in the example embodiment may have the same or a different allowed security right.

As shown in FIG. 6, each of a plurality of different destinations (A-1, A-2, A-3, . . . , C3) may have an allowed security right assigned or preset thereto. The storage unit 120 may store therein information on an allowed security right to each destination.

The allowed security right may be understood as information which defines a security type (or a security level) with which a user can enter or access a corresponding destination.

For instance, a settable security right to a destination may include a plurality of security types (or security levels, hereinafter will be referred to as "security types"). For instance, the security right may include security types categorized as first to fifth types. An operator who manages a building corresponding to a destination may set at least one of a plurality of security types as an allowed security right, based on a purpose of the building, a necessity degree (or a desired degree) of security, etc. In this case, only a user who has the allowed security right set to the building corresponding to the destination may enter the corresponding destination (or building).

Meanwhile, in the present disclosure, the destination does not necessarily mean a single building physically differentiated, but may mean a specific getting-off place among a plurality of getting-off places included in a building.

For example, one building physically differentiated may include a plurality of getting-off places (or boarding places), and each of the getting-off places may have a set security type. The plurality of getting-off places corresponding to the same building may have the same security type, or at least one of them may be set to have a different security type from the remaining getting-off places.

Meanwhile, a plurality of getting-off places (or boarding places) included in a building may be connected to an entrance (or a gate) of the building, or may mean an entrance of the building. Thus, a plurality of getting-off places may exist at a building having a plurality of entrances.

In some cases, a building having a plurality of entrances needs to have a different security type set to each of the entrances (or getting-off places corresponding thereto), because accessible specific facilities, equipment, places, areas, etc. inside the building are different according to each entrance.

Thus, in the present disclosure, the controller 150 may check an allowed security right to a destination corresponding to a building or a specific getting-off place included in the building, and may detect (or check) a security right of a user who has got on the vehicle.

Meanwhile, the aforementioned getting-off place may be expressed as a stop of the vehicle, a depot or a station.

In the specification, for convenience, will be explained a case that a destination is a "specific building". However, the following descriptions are not limited to the case that a destination is a specific building, but may be equally applied to a case that a destination is a specific getting-off place (or a specific entrance of a building).

Hereinafter, a method to detect (or check) a user's security right will be explained in more detail. For instance, an allowed security right to a first destination (building A-1, 610) may include security types of first and fourth types. In this case, a user should have a security right corresponding to one of the first and fourth types, in order to enter the first destination.

As another example, an allowed security right of a second destination (building B-1, 620) may include security types of first to fifth types. In this case, a user should have a security right corresponding to one of the first to fifth types, in order to enter the second destination.

As still another example, an allowed security right of a third destination (building C-3, 630) may include security types of first, second and fourth types. In this case, a user should have a security right corresponding to one of the first, second and fourth types, in order to enter the third destination.

Like this, each destination may have an allowed security right desired (or alternatively, preset) thereto, and the controller 150 may check an allowed security right of each destination included in a driving path.

Further, the controller 150 may detect a security right of a user who has got on the vehicle.

For instance, the controller 150 may detect a security right of a user who has got on the vehicle, based on the user's boarding into the vehicle. In some example embodiments, the controller 150 may detect the security right of the user who has got on the vehicle, in a state that the vehicle stops. After completion of the detection of the user's security right, the controller 150 may control the vehicle to start. In some example embodiments, the controller 150 may control the vehicle to start even before completion of the detection of the user's security right.

As another example, the controller 150 may detect the user's security right regardless of a stopped state or a driving state of the vehicle. In some example embodiments, the controller 150 may detect the user's security right until before the vehicle reaches a destination included in a driving path. In some example embodiments, the destination may correspond to a destination where the vehicle that has started reaches for the first time.

In order to detect the user's security right, the controller 150 may sense user information through the sensing unit 130.

The controller 150 may detect the user's security right by using the sensed information. In this case, the sensed information may include information on a security right. For instance, as aforementioned with reference to FIG. 3(*b*), an identification mark possessed by the user may include information on a security right. In this case, the controller 150 may detect the user's security right by merely sensing the identification mark through the sensing unit 130*b*.

Further, the sensed information may include user information (or user's identification information) other than security right information. As the user's identification information, various information may be included. For instance, there may exist a user name, a date of one's birth, an address, a phone number, an employee identification number, an ID, a facial image, bio information (fingerprint information, iris information, etc.), etc.

For instance, as shown in FIG. 3(*a*), the controller 150 may sense information on a user who has got on the vehicle by using cameras 130*a*. In this case, as shown in FIG. 3(*a*), the controller 150 may obtain a facial image of the user 1000 who has got on the vehicle, from images received through the cameras 130*a* for capturing a space in the vehicle 10. The controller 150 may detect the user's security right through an analysis of the obtained facial image.

The controller 150 may detect a security right included in (or matched with) user information corresponding to the obtained facial image, based on a user database. Here, the user DB may mean a set of user-related information. The user-related information may include at least one of a user's identification information (e.g., a user name, a date of one's birth, an address, a phone number, an employee identification number, an ID, a facial image, and/or bio information (fingerprint information, iris information, etc.)), and information on a user's security right.

As shown in FIG. 8, the user DB may have security types matched with users 801~808, respectively.

For instance, user information of the first to third users 801, 802, 803 may include information on a security right of a first type. For example, information on a security right of a first type may exist at facial images of the first to third users 801, 802, 803, in a matching manner. The first to third users 801, 802, 803 having the security right (or security type) of the first type can enter buildings of A-1, A-2, B-1, B-2, C-1, C-2 and C-3 shown in FIG. 6.

As another example, user information of the fourth user 804 may include information on a security right of a fourth type. For example, information on a security right of a fourth type may exist at a facial image of the fourth user 804, in a matching manner. The fourth user 804 having the security right (or security type) of the fourth type can enter buildings of A-1, A-3, B-1 and C-3 shown in FIG. 6.

Like this, accessible destinations (or buildings) may be changed according to a security right matched with each user.

Meanwhile, as a method to detect a user's security right, there may exist various methods (e.g., a fingerprint recognition method, an iris recognition method) as well as the aforementioned method. Thus, example embodiments are not limited to the aforementioned method.

As aforementioned, once an allowed security right to a destination and a security right of a user who has got on the vehicle are detected, the controller 150 may perform a security check (or a security process) based on the allowed security right to the destination and the security right of the user who has got on the vehicle (S530).

In the present disclosure, the "security process" is a process for restricting a user who does not satisfy an allowed security right desired (or alternatively, preset) to a destination from entering the destination, and may be performed based on a user's security right and an allowed security right to a destination.

If a security process is performed, the controller 150 may restrict a user who wishes to get off among users who have got on the vehicle from getting off, according to whether a security right of the user satisfies an allowed security right desired (or alternatively, preset) to a corresponding destination.

Methods to restrict getting off the vehicle may vary. For instance, in a case that a security process is performed, the controller 150 may restrict a user who wishes to get off from getting off, by controlling an open state of the door provided at the vehicle. Procedures to perform a security process will be explained later in more detail with the attached drawings. Hereinafter, cases where a security process is performed will be firstly explained.

In some example embodiments, the security check system 100 may perform a security check (or a security process) only when a security check is desired, in order to reduce or minimize inconvenience of a user who has got on the vehicle, due to execution of the security process.

For example, the controller 150 may perform a security check only when a security right of a user who has got on the vehicle does not satisfy an allowed security right desired (or alternatively, preset) to a destination.

For example, the controller 150 may compare a user's security right with an allowed security right desired (or alternatively, preset) to a destination.

If a result of the comparison indicates that the user's security right does not satisfy the allowed security right desired (or alternatively, preset) to the destination, the controller 150 may perform a security process. That is, if the user's security right satisfies the allowed security right desired (or alternatively, preset) to the destination, a security process may not be performed. In this case, the user may not recognize a security check that is performed in the vehicle, and user's inconvenience due to the security check may be reduced or minimized.

For instance, in a case that an allowed security right desired (or alternatively, preset) to a destination is a third type and a security right of a user who has got on the vehicle is a second type, the controller 150 may determine that the user's security right does not satisfy the allowed security right desired (or alternatively, preset) to the destination. In this case, a security process may be performed.

On the contrary, in a case that an allowed security right desired (or alternatively, preset) to a destination is a third type and a security right of a user who has got on the vehicle is a third type, the controller 150 may determine that the user's security right satisfies the allowed security right desired (or alternatively, preset) to the destination. In this case, a security process may not be performed.

Further, in a case that a plurality of users have got on the vehicle, the controller 150 may check a security right of each of the plurality of users. Here, if even one user does not satisfy an allowed security right desired (or alternatively, preset) to a destination, the controller 150 may determine that the security rights of the users who have got on the vehicle do not satisfy the allowed security right desired (or alternatively, preset) to the destination. In this case, a security process may be performed. For instance, if the allowed security right desired (or alternatively, preset) to the destination is a third type and the security rights of the users who have got on the vehicle are first and third types, the controller 150 may perform a security process based on the user who has the security right of the first type.

Meanwhile, in a case that the number of destinations included in a driving path is plural, the controller 150 may compare a user's security right with all of allowed security rights desired (or alternatively, preset) to the plurality of destinations. In a case that a plurality of destinations are included in a driving path, the controller 150 may compare a user's security right with each of allowed security rights desired (or alternatively, preset) to the plurality of destinations. If the result of the comparison indicates that the user's security right does not satisfy the allowed security right to at least one of the plurality of destinations, the controller 150 may perform a security process.

For instance, as shown in FIG. 7, in a case that a plurality of destinations (e.g., buildings of A-1, B-1 and C-3) are included in a driving path of the vehicle, the controller 150 may check all of allowed security rights to the plurality of destinations. In this case, the controller 150 can extract a common allowed security right to enter all of the plurality of accessible destinations, by checking an allowed security right to each of the plurality of destinations.

For instance, referring to FIGS. 6 and 7, allowed security rights of a first destination (building A-1) may include security types of a first type and a fourth type. Allowed security rights of a second destination (building B-1) may include security types of first to fifth types. Allowed security rights of a third destination (building C-1) may include security types of a first type, a second type and a fourth type.

In this case, common allowed security rights for entering all of the first to third destinations may be configured as security types of the first type and the fourth type.

In this case, if a user who satisfies the allowed security rights to the plurality of destinations, that is, a user who satisfies the common allowed security rights has got on the vehicle, the controller 150 may omit a security process.

For instance, as shown in FIG. 8(*a*), it is assumed that first to third users 801, 802, 803 having a security right of a first type, and a fourth user 804 having a security right of a fourth type have got on the vehicle.

Further, it is assumed that a driving path of the vehicle includes a plurality of destinations, first to third destinations (buildings A-1, B-1, C-3), and each of the destinations is equally set to allow a user who has a security right of the first or fourth type to enter.

In this case, the controller 150 may determine that the users' security rights satisfy the allowed security rights to the plurality of destinations (e.g., the common allowed security rights). The reason is that the users' security rights are equal to or included in the common allowed security rights.

Thus, the controller 150 may determine that the users who have got on the vehicle can get off at any destination included in the driving path of the vehicle, only if the security rights of the users is the first or fourth type.

In this case, the controller 150 may not perform a security process (or a security check) and thus the users who have got on the vehicle can get off at any destination included in the driving path.

As another example, as shown in FIG. 8(*b*), it is assumed that a fifth user 805 having a security right of a first type, a sixth user 806 having a security right of a second type, a seventh user 807 having a security right of a third type, and an eighth user 808 having a security right of a fourth type have got on the vehicle. In this case, the users' security rights may be configured as first to fourth types, respectively.

Further, it is assumed that the driving path of the vehicle includes a plurality of destinations, first to third destinations (buildings A-1, B-1, C-3), and each of the destinations is equally set to allow a user who has a security right of the first or fourth type to enter.

In this case, the controller 150 may determine that the users' security rights do not satisfy the allowed security rights to the destinations. The reason is because the sixth user 806 having a security right of a second type and the seventh user 807 having a security right of a third type who do not satisfy the common allowed security rights (the security rights of the first type and the fourth type) are in the vehicle.

That is, the controller 150 may perform a security process (or a security check) in a case that even at least one of the users who have got on the vehicle does not have a security right the same as or included in the common allowed security rights.

In this case, security rights of all users who have got on the vehicle may be compared with security rights of destinations included in a driving path, in order to block or prevent any user from entering a destination that is out of range of the user's security right.

The controller 150 may check whether to perform a security process a plurality of times after the vehicle starts to drive.

The reason is that the common allowed security rights to the remaining destinations may change whenever the vehicle passes through one of the plurality of destinations included in the driving path.

For instance, as shown in FIG. 7, after the vehicle passes through the first destination (building A-1), the common allowed security rights may be determined based on the allowed security rights of the second and third destinations (buildings B-1, C-3). In this case, the common allowed security rights of the second and third destinations (buildings B-1, C-3) may include a first type, a second type and a fourth type. If a user having a security right of the first, second or fourth type has got on the vehicle, the controller 150 may not perform a security process (or a security check). Like this, the common allowed security rights may be updated according to a driving degree of the vehicle.

In the aforementioned descriptions, explained was a case that user information on a user who has got on the vehicle exists in the user DB. However, user information on a user who has got on the vehicle may not exist in the user DB. For instance, if a user who has got on the vehicle corresponds to an illegal or unauthorized passenger, user information may not exist in the user DB. In a case that a security type of a specific user cannot be detected through a sensing means provided in the vehicle, the controller 150 may perform a security process without a step of comparing security rights of destinations included in a driving path with security rights of other passengers within the vehicle. The reason is that the specific user does not have an entry right to all the destinations included in the driving path.

In some example embodiments, the controller 150 may not perform a security process even when a security right of a user who has got on the vehicle does not satisfy an allowed security right to a destination, in order to reduce or minimize user's inconvenience due to execution of the security process.

For example, the controller 150 may determine whether to execute a security process or not, by sensing or analyzing an intention to get off of the user who has got on the vehicle. For instance, in a state that the vehicle has approached or reached a specific destination, the controller 150 may not perform a security process, if it is sensed that the user who does not satisfy an allowed security right of the specific destination does not have an intention to get off at the specific destination.

That is, the controller 150 may perform a security process only when the user who does not satisfy the allowed security right of the specific destination is sensed to have an intention to get off at the specific destination.

The method to sense or analyze the user's intention to get off may vary.

Figure 9A:
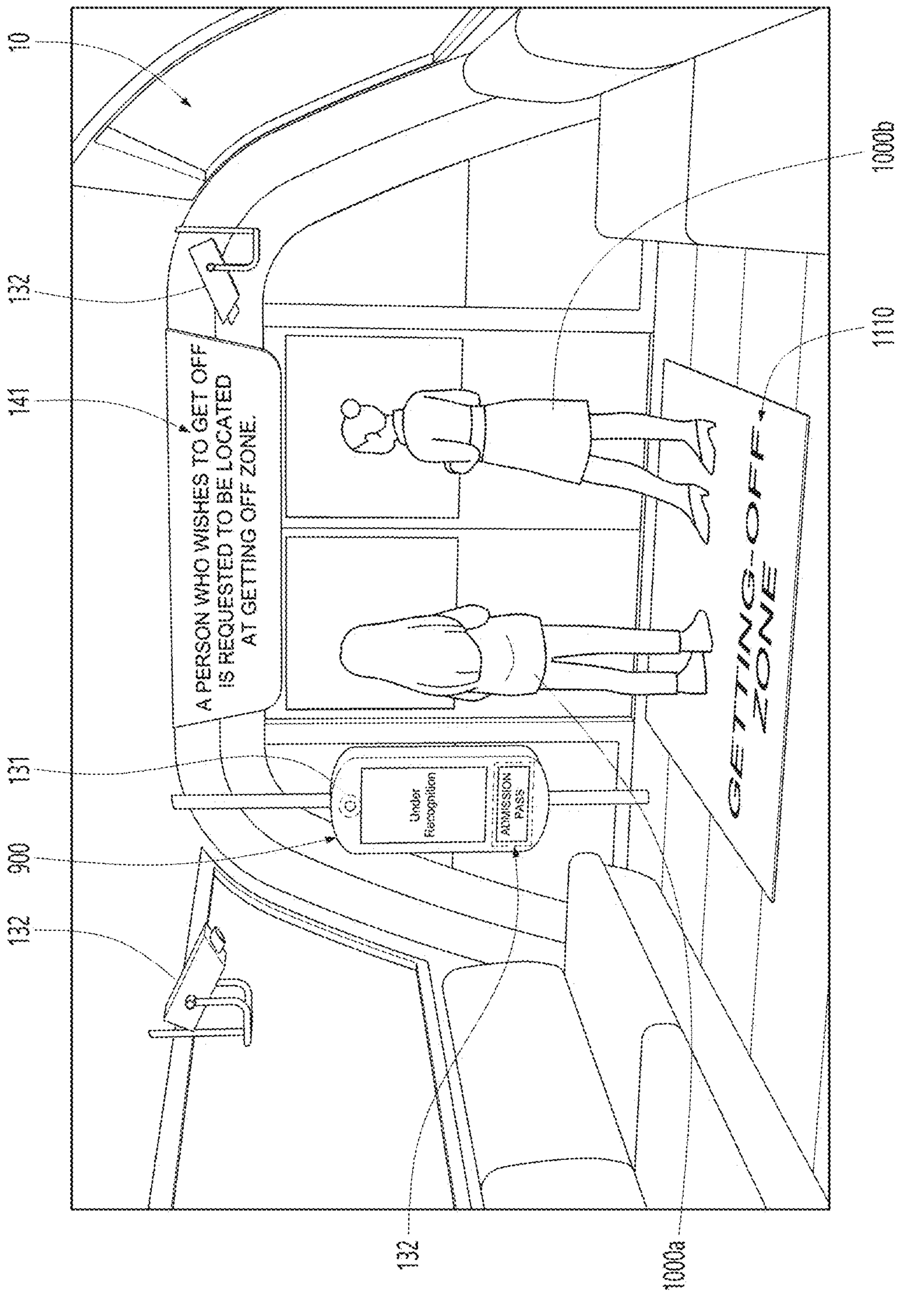
FIGS. 9A, 9B, 10A, 10B and 11 are conceptual views for explaining a security process according to some example embodiments.

For instance, as shown in FIG. 9A, the controller 150 may specify users 1000*a*, 1000*b* positioned within a desired (or alternatively, preset) region 1110 of the vehicle 10, among users who have got on the vehicle 10, as users 1000*a*, 1000*b* who are objects to get off. The controller 150 may determine whether security rights of the users 1000*a*, 1000*b* who are objects to get off satisfy an allowed security right desired (or alternatively, preset) to a destination corresponding to this stop of the vehicle. For instance, in a case that first to third destinations are included in a driving path of the vehicle and a stopping destination of the vehicle is a second destination, the controller 150 may determine whether the users 1000*a*, 1000*b* positioned within the desired (or alternatively, preset) region 1110 who are objects to get off have security rights which satisfy an allowed security right of the second destination.

If a result of the determination indicates that the users 1000*a*, 1000*b* who are objects to get off have security rights that do not satisfy the allowed security right of the destination, the controller 150 may execute a security process. On the contrary, if the result of the determination indicates that the users 1000*a*, 1000*b* who are objects to get off have security rights that satisfy the allowed security right of the destination, the controller 150 may not execute a security process.

Here, the desired (or alternatively, preset) region 1110 may be positioned near the door provided at the vehicle 10. As shown, the desired (or alternatively, preset) region 1110 may be displayed in a distinguished manner from another region of the vehicle 10 such that users who have got on the vehicle recognize the desired (or alternatively, preset) region 1110.

Figure 9B:
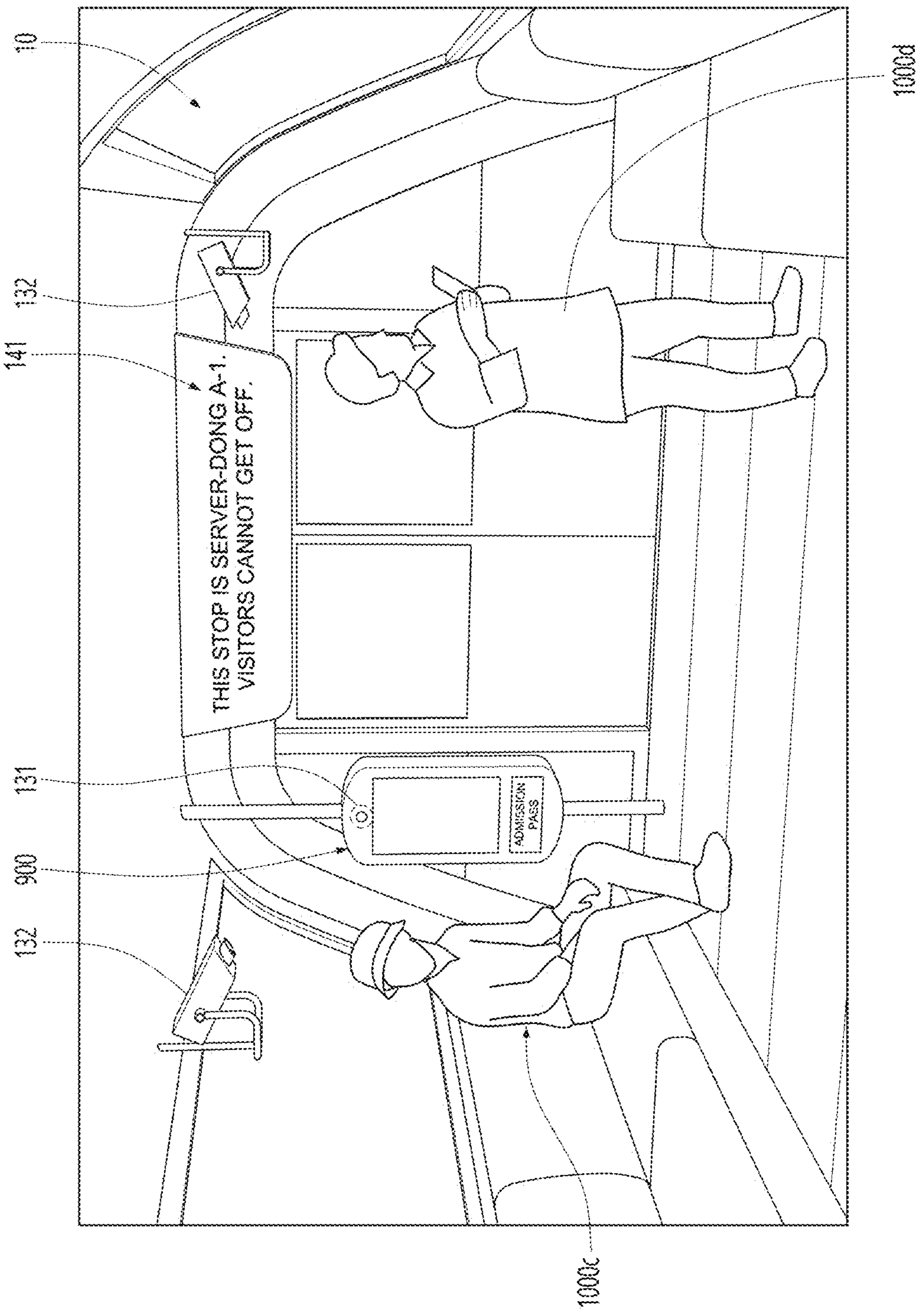

As another example, as shown in FIG. 9B, the controller 150 may determine a user's intention to get off, by sensing a gesture of the user who has got on the vehicle 10.

The controller 150 may capture a space within the vehicle by using cameras 132 provided in the vehicle 10. The controller 150 may extract a user's gesture from the captured image. The controller 150 may determine whether the user corresponds to a user having an intention to get off the vehicle 10, based on the extracted user's gesture.

Gesture information on a gesture of a user who has an intention to get off, or a gesture of a user who does not have an intention to get off may exist in the storage unit 120.

For instance, as shown in FIG. 9B, although the vehicle 10 has approached or reached a destination, a user may sit in the vehicle 10, may be positioned far from the door (entrance) of the vehicle 10, or may not look at the door of the vehicle 10. Such gestures of the user may correspond to a gesture having no intention to get off.

The controller 150 may specify a user who is an object to get off or a user having no intention to get off, based on an extracted gesture and the gesture information stored in the storage unit 120 (e.g., by comparing an extracted gesture with the gesture information stored in the storage unit 120).

For instance, if a user who is an object to get off is specified based on a user's gesture sensed through the cameras 132 provided at the vehicle 10, the controller 150 may determine whether a security right of the user who is an object to get off satisfies an allowed security right desired (or alternatively, preset) to a destination corresponding to this stop (the current stop) of the vehicle. If a result of the determination indicates that the security right of the user who is an object to get off does not satisfy the allowed security right of the destination, the controller 150 may execute a security process. On the contrary, if the result of the determination indicates that the security right of the user who is an object to get off satisfies the allowed security right of the destination, the controller 150 may not execute a security process.

As another example, if users having no intention to get off are specified based on users' gestures sensed through the cameras 132 provided at the vehicle 10, the controller 150 may determine whether the users 1000*c*, 1000*d* (refer to FIG. 9B) having no intention to get off correspond to all users who do not satisfy an allowed security right to the current destination of the vehicle, among users who have got on the vehicle.

In this case, the controller 150 may determine that the remaining users except for the users having no intention to get off at the current destination have security rights to enter the current destination. Thus, in this case, a security process may not be executed.

Like this, even in a case that a user having no security right to a specific destination among a plurality of destinations included in a driving path of the vehicle has got on the vehicle, the controller 150 may omit a security process to thus enhance user's convenience.

In the aforementioned descriptions, the security type was explained as an example of the security right. In some example embodiments, the security right may be also expressed as a security level. In this case, each destination may have a desired or minimum security level desired (or alternatively, preset) for entry.

Such a security level may include a plurality of levels (or grades). For instance, the security level may include first to fifth security levels. For instance, the first security level is a highest security level among a plurality of security levels, which may be a security level to enter all buildings positioned in a specific area. The fifth security level may be a lowest security level among the plurality of security levels. A user having the fifth security level has more restrictions on the number of accessible buildings among all buildings positioned in a specific area, than a user having the first security level. The number of accessible buildings may be decreased towards the fifth security level from the first security level.

For instance, a first destination having the first security level desired (or alternatively, preset) thereto enables only users having the first security level to enter. Thus, users having the second to fifth security levels cannot enter the first destination.

As another example, a second destination having the third security level desired (or alternatively, preset) thereto enables only users having the first, second and third security levels to enter. Thus, users having the fourth and fifth security levels cannot enter the second destination.

In this case, the controller 150 may detect (or specify) a highest security level among security levels desired (or alternatively, preset) to a destination (or a building corresponding to a destination) included in a driving path.

Then, the controller 150 may check security levels of users who have got on the vehicle, and may detect a lowest security level among the checked security levels.

In this case, the controller 150 may compare a highest security level set to a destination, with a security level of a specific user having a lowest security level among the users who have got on the vehicle. If the security level of the specific user is higher than the highest security level set to the destination, the controller 150 may not execute a security process.

For instance, if a result of the comparison indicates that the security level of the specific user is the second security level and the highest security level set to the destination is the third security level, the controller 150 may not execute a security process. The reason is that the security levels of the users who have got on the vehicle are security levels that enable entry to all destinations included in the driving path.

On the contrary, if the result of the comparison indicates that the security level of the specific user is lower than the highest security level set to the destination, the controller 150 may execute a security process.

For instance, if the security level of the specific user is the third security level and the highest security level set to the destination is the second security level, the controller 150 may execute a security process. The reason is that the security level of at least a part of the users who have got on the vehicle is a security level prohibiting entry to all destinations included in the driving path.

Like this, in some example embodiments, the security right may be understood as a concept of the security level. The concept of the security level may be equally applied to various example embodiments explained in this specification.

Hereinafter, a security process will be explained in more detail. As aforementioned, in the present disclosure, the "security process" is a process for restricting a user who does not satisfy an allowed security right desired (or alternatively, preset) to a destination from entering the destination, and may be performed based on a user's security right and an allowed security right to a destination.

If a security process is performed, the controller 150 may restrict a user who wishes to get off among users who have got on the vehicle from getting off, according to whether a security right of the user satisfies an allowed security right desired (or alternatively, preset) to a corresponding destination.

Methods to restrict getting-off the vehicle may vary. For instance, in a case that a security process is performed, the controller 150 may restrict a user who wishes to get off from getting off by controlling an open state of the door provided at the vehicle.

Figure 10A:
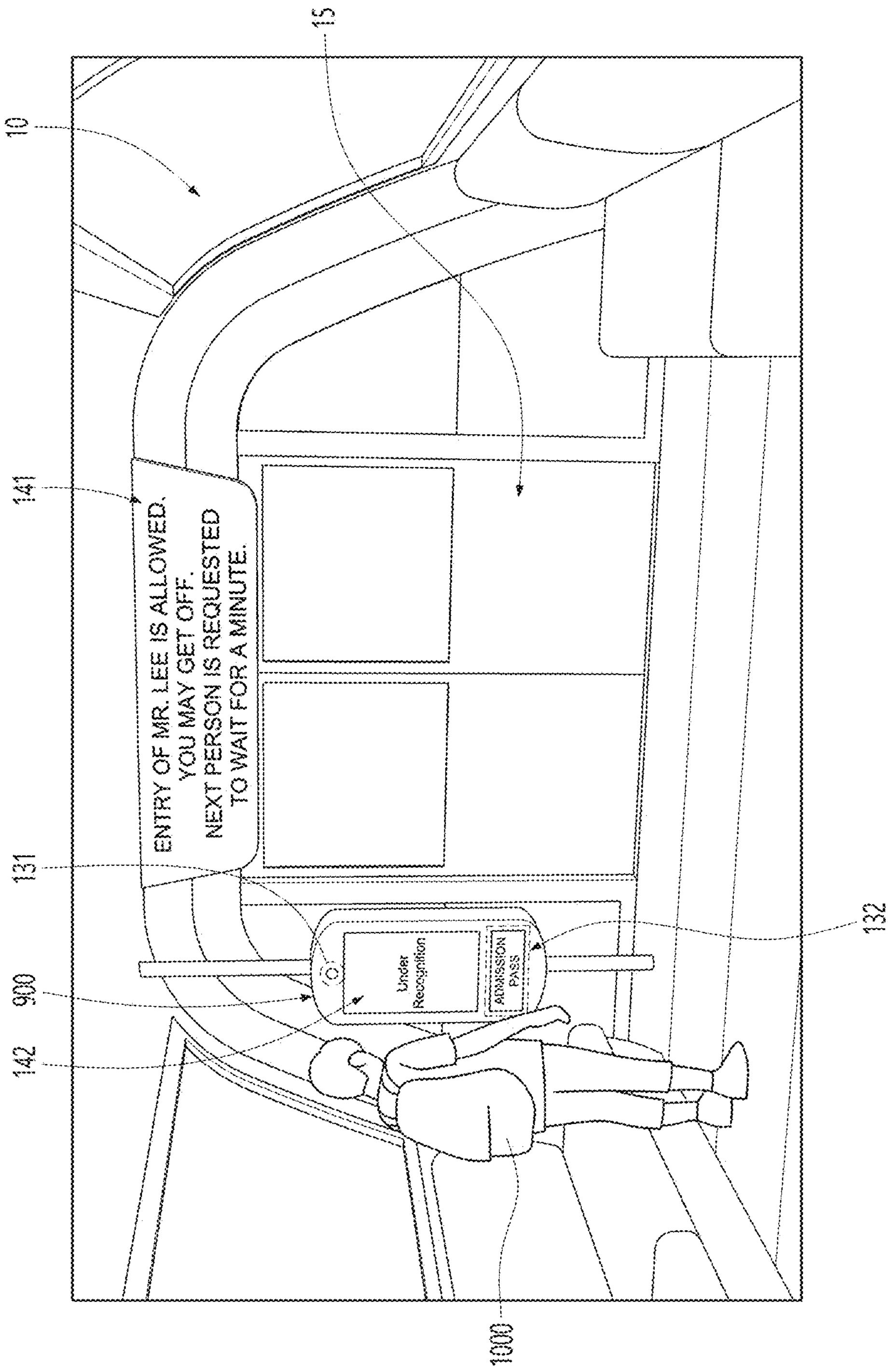

In this case, as shown in FIG. 10A, the controller 150 may restrict the user's getting-off by controlling a door 15 (or a door portion, or an entrance door) having one of an open state and a closed state.

Hereinafter, a method to restrict a user's getting-off by controlling the door 15 of the vehicle will be explained under an assumption that a security process has been performed. Further, "a user who is an object to get off" to be explained hereinafter may be a user who wishes to get off the vehicle 10 among users who have got on the vehicle 10.

During execution of a security process, although the vehicle 10 has reached a destination, the controller 150 may maintain a closed state of the door 15. The door 15 of the vehicle 10 may be in a closed state while the vehicle 10 is driving. That is, even if the vehicle has reached a destination, the controller 150 may maintain the closed state of the door 15, in a case that a security check over a user who is an object to get off is not completed. On the contrary, if a security process has not been executed (e.g., if it is determined that there is no need to perform a security process), the door 15 of the vehicle 10 is converted into the open state when the vehicle 10 reaches a destination. In this case, users who are objects to get off may freely get off the vehicle 10.

During execution of a security process, the controller 150 may perform a procedure to check a security right of a user who is an object to get off (hereinafter, will be expressed as a term of "a security check"), based on arrival or approach of the vehicle 10 at/to a destination. The method to check a user's security right may vary. For instance, as shown in FIG. 10A, the controller 150 may sense user information through an electronic device 900 provided in the vehicle 10, and may detect a security right of the user from the sensed information.

As shown, the electronic device 900 may include at least one sensing means (e.g., an NFC sensing unit, a camera, a fingerprint recognition unit, and an iris recognition unit). Further, the controller 150 can sense information of a user who is an object to get off by using the cameras provided in the vehicle aforementioned with reference to FIG. 3(*a*).

Like this, the controller 150 may sense information of a user who is an object to get off by using various sensing means, in order to detect (or check) a security right of the user. Then, the controller 150 may detect a security right of the user by using the sensed information. In this case, the sensed information may include information on a security right.

Further, the sensed information may include user information (or user's identification information) other than information on a security right. The user's identification information may vary, and for instance, may include a user's name, a date of one's birth, an address, a phone number, an employee identification number, an ID, a facial image, and/or bio information (fingerprint information, iris information, etc.), etc.

The controller 150 may detect or check a security right included in (or matched with) user information corresponding to the obtained facial image, fingerprint information, iris information, etc., by referring to user database (DB).

As shown in FIG. 10A, if a result of the checking indicates that the security right of the user 1000 who is an object to get off enables entry to the current destination, the controller 150 may control the door 15 provided at the vehicle 10 to be in an open state.

In a case that the number of users who are objects to get off is plural, the controller 150 may convert the door 15 into a closed state, after a first user who is an object to get off gets off as a security check over the first user who is an object to get off is completed.

That is, even if there exists a second user who is an object to get off different from the first user who is an object to get off, the controller 150 may control an open or closed state of the door such that an open state of the door 15 is converted into a closed state, based on completion of getting-off of the first user who is an object to get off. And the controller 150 may control an open or closed state of the door 15, based on that the second user who is an object to get off has a security right which satisfies an allowed security right to the current destination.

Like this, the controller 150 may perform a security check over each of a plurality of users who are objects to get off, thereby allowing a user who is an object to get off having undergone a security check to get off the vehicle 10. Thus, the controller 150 may induce users having undergone a security check to get off the vehicle 10 one by one, by controlling an open or closed state of the door 15 of the vehicle 10.

As shown, a display unit 141 or a sound output unit (not shown) provided in the vehicle may output guide information on a situation of a security check being performed in the vehicle 10.

Although not shown, an open direction of the door of the vehicle 10 may be variously designed. For instance, the door of the vehicle 10 may have one of an open state and a closed state with moving from the lower side of the vehicle 10 to the upper side. On the contrary, the door of the vehicle 10 may have one of an open state and a closed state with moving from the upper side of the vehicle 10 to the lower side.

In this case, the controller 150 may restrict or allow getting-off of a user who is an object to get off by controlling an open degree (or a closed degree) of the door.

For instance, in a case that the vehicle has reached a destination, the controller 150 may control the door to be partially open. In this case, a user who has got on the vehicle may recognize that the vehicle has reached the destination, and may recognize that an additional security check is being performed for getting-off. In a case that the security check over the user who is an object to get off is completed, the controller 150 may allow the user to get off by controlling the door to be wholly open.

Figure 10B:
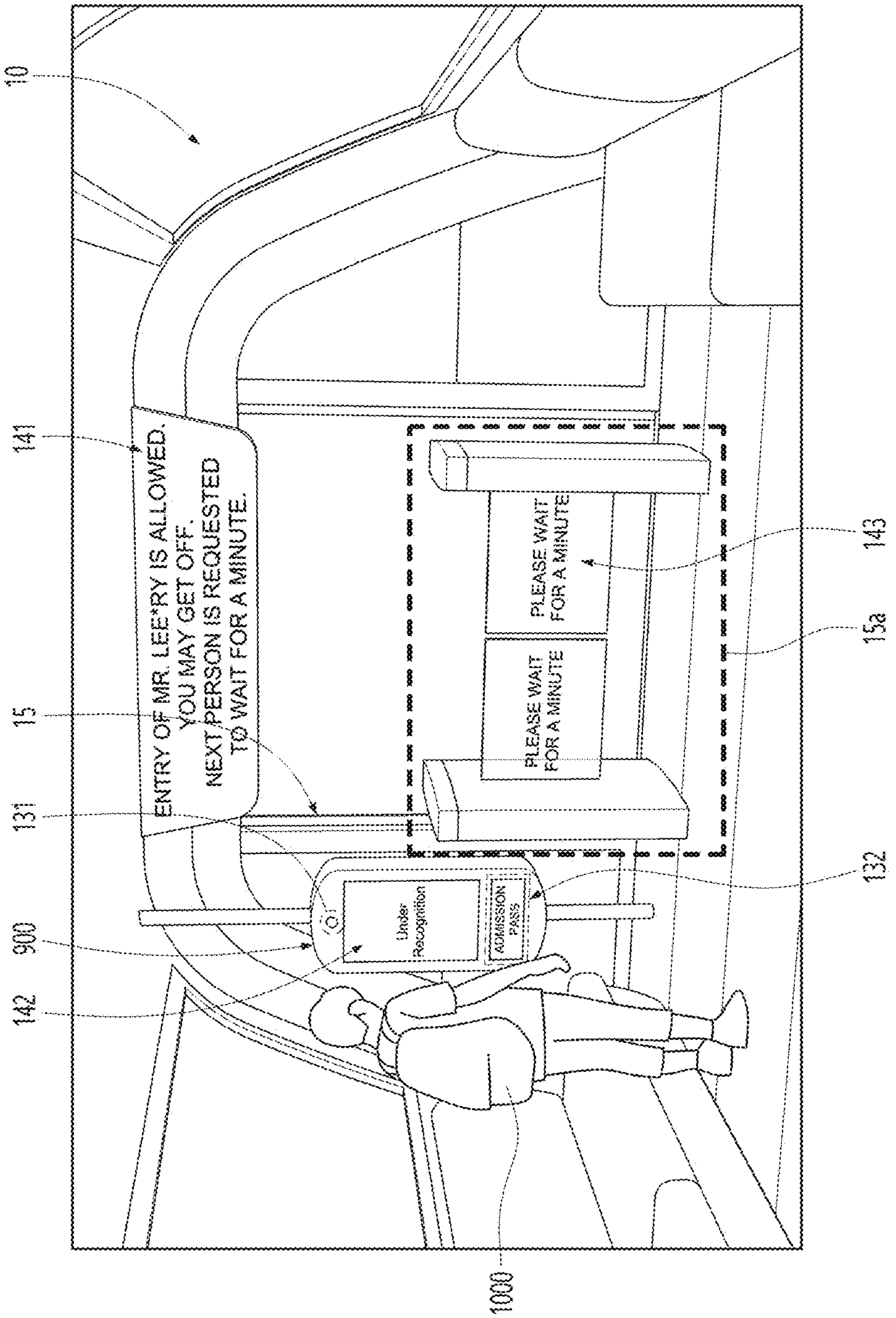

In some example embodiments, the controller 150 may use other means as well as the door 15 of the vehicle in order to control getting-off of a user who is an object to get off. For instance, as shown in FIG. 10B, an auxiliary means (e.g., a speed gate 15*a*, etc.) for controlling a user's getting-off may be provided at the vehicle 15. In this case, the controller 150 may convert a closed state of the door 15 of the vehicle into an open state as the vehicle reaches a destination. However, in this case, if the security check over the user who is an object to get off is not completed, the speed gate 15*a* may be in a closed state. In this case, the user who has got on the vehicle may recognize that the vehicle has reached the destination, and may recognize that an additional security check is being performed for getting-off.

As aforementioned with reference to FIG. 10B, the auxiliary means 15*a* such as the speed gate may be controlled to be an open state only when the security check over the user who is an object to get off is completed, thereby allowing the user's getting-off.

As shown, the auxiliary means 15*a* such as the speed gate may be provided with a display region 143. Further, state information on a security check being performed in the vehicle may be output to the display region 143.

Although not shown, the auxiliary means for controlling a user's getting-off may vary. For instance, the vehicle may be provided with a laser output unit or a light source unit. Such a laser output unit or a light source unit may be arranged near the door of the vehicle 10. In a case that the vehicle has reached a destination, the controller 150 may control the door of the vehicle to an open state, and may locate laser or light to the entrance door of the vehicle through the laser output unit or the light source unit. Such laser or light may form a virtual door. In the case that such a virtual door is formed, a user who is an object to get off may recognize that passing through the entrance door is impossible.

If the security check over the user who is an object to get off is completed, the controller 150 may stop the output of the laser or light, and may inform a possibility of entering the destination to the user who is an object to get off.

If a result of the checking indicates that the security right of the user who is an object to get off is a security right prohibiting entry to the destination, the controller 150 may control the door provided at the vehicle to maintain a closed state. In this case, as shown in FIG. 11, the controller 150 may provide guide information related to destinations where the user who is an object to get off can enter with his/her security right, among destinations included in the driving path, on a display unit 142 provided at the vehicle. As shown in FIG. 11, the guide information may include at least one of announcement information 1010 for announcing that the user who is an object to get off cannot get off at the current destination, and destination information on destinations 1020, 1030, 1040 where the user who is an object to get off can enter with his/her security right.

Further, the guide information may further include destination information 1050 for the user who is an object to get off to set a spot where the user has got on the vehicle 10 (hereinafter, will be referred to as "a boarding spot") as a destination. In a case that the boarding spot is selected as a destination by the user who is an object to get off, the controller 150 may include the boarding spot in the driving path as a destination. That is, in a case that the boarding spot is not included in destinations desired (or alternatively, preset) to the vehicle 10, the controller 150 may update the desired (or alternatively, preset) driving path such that a new driving path including the boarding spot is formed. In some example embodiments, the controller 150 may obtain information on the boarding spot of the user who is an object to get off, based on the user information obtained in order to check the security right of the user who is an object to get off.

As shown in FIGS. 12A and 12B, in some example embodiments, the vehicle 10 may a transparent display unit 143 having a light transmittance. In this case, the transparent display unit 143 may serve as both a window of the vehicle 10 and a display. The controller 150 may maintain a security of a specific building or a specific area by using the light transmittance of the transparent display unit 143.

For instance, as shown in FIG. 12A, the transparent display unit 143 may have a light transmittance for allowing a user inside the vehicle to recognize an external space of the vehicle 10. As shown in FIG. 12B the transparent display unit 143 may have a light transmissivity for preventing a user inside the vehicle from recognizing an external space of the vehicle 10. The controller 150 may maintain a security of the external space of the vehicle 10 for a user positioned in the vehicle 10 when needed, by controlling a light transmittance (or a light transmission degree) of the transparent display unit 143.

For instance, in a case that the vehicle 10 is running along the driving path near a destination where a user inside the vehicle cannot access with his/her security right (or in a case that the vehicle 10 has reached a destination), the controller 150 may change a light transmission degree of the transparent display unit 143 shown in FIG. 12B. The controller 150 may maintain a security of the external space when needed, by increasing or decreasing a light transmission degree.

Meanwhile, the controller 150 can selectively control the transparent display unit positioned near a specific user among users who have got on the vehicle. Here, the specific user may mean a user who does not have a security right to a spot where the vehicle is currently driving, or a destination where the vehicle has reached. As shown in FIG. 12C, the controller 150 may sense a position of a specific user 1000 inside the vehicle 10 by using the sensing unit 130 provided in the vehicle 10, and may control the outside of the vehicle 10 not to be visible by the specific user 1000, by controlling a light transmission degree of the transparent display unit 143 arranged at the sensed position.

Further, the transparent display unit 143 may display guide information.

As shown, the guide information 1210, 1220 may include at least one of feature information 1210 about a current path of the vehicle (e.g., "You are now passing through a security area."), and information guide information 1220 for the specific user 1000 (e.g., "Ms. Kim, You cannot get off at building C-1).

As aforementioned, in the security check methods and systems according to some example embodiments, a security process may be performed only when there exists a user having no entry right (or a security right) to a specific complex or building, among users who have got on the vehicle. That is, a security process may not be performed in a case that all of users who have got on the vehicle have an entry right (or a security right) to a specific complex or building. Like this, in some example embodiments, a security check is performed only when it is necessarily desired. This may reduce consumption of computing resources (and thus power consumption), thereby reducing or minimizing user's inconvenience due to the security check and reducing a processing time for a security check.

Despite the execution of the security process, a user having no security right to a destination may get off the vehicle 10.

In this specification, for convenience, "a user having no security right" will be referred to as "a wrong getting-off user". Such a wrong getting-off user may be various types of users. For instance, the wrong getting-off user may be a visitor who has firstly visited a specific area or building, or an intruder who has entered with an impure intention. Further, the wrong getting-off user may be a staff member or an employee, a researcher, a resident, etc. each having no security right to a specific area.

If it is sensed that a wrong getting-off user has got off the vehicle 10, the controller 150 may transmit information notifying the occurrence of the wrong getting-off user, to a control system (or a management system) related to a destination where the wrong getting-off user has got off. Such information may include information related to the wrong getting-off user (e.g., a name, a face, and/or a getting-off place).

Thus, the control system may search for or monitor the wrong getting-off user in a building or an area corresponding to the destination, based on the information related to the wrong getting-off user. In this case, the information related to the wrong getting-off user may be output to an output unit (e.g., a display unit) provided in the building corresponding to the destination. This may allow the wrong getting-off user to recognize that he or she has entered the destination erroneously. Further, this may allow other users inside the destination to recognize the wrong getting-off user based on the outputted information, and may induce them to help expel or to report the wrong getting-off user.

Further, the controller 150 may transmit information notifying the occurrence of the wrong getting-off user, to another vehicle. As shown in FIG. 13, a display unit 143 of at least one of the vehicle 10 and another vehicle may output information 1310, 1320 related to the wrong getting-off user.

In some example embodiments, the information related to the wrong getting-off user is shared among different vehicles. Accordingly, in a case that the wrong getting-off user has got on another vehicle, the wrong getting-off user may be guided to an accessible destination.

For instance, the controller 150 may detect a user corresponding to the wrong getting-off user from users who have got on the vehicle 10, based on the information related to the wrong getting-off user received from another vehicle. Then, information on a destination where the wrong getting-off user can enter with his or her security right, or information on a spot where the wrong getting-off user has firstly got on the vehicle may be provided to an output unit (e.g., a display unit) provided in the vehicle 10. Further, the controller 150 may receive a destination selected from the wrong getting-off user, based on the provided information. And the controller 150 may induce the wrong getting-off user to safely get off, by including the destination selected by the wrong getting-off user in the driving path.

In a case that boarding of the wrong getting-off user is detected, the controller 150 may transmit notification information notifying the boarding of the wrong getting-off user, to a vehicle from which the wrong getting-off user has erroneously got off, or a control system. Accordingly, the vehicle from which the wrong getting-off user has erroneously got off, or the control system may recognize that the wrong getting-off user has normally returned from a destination (or a building) to which the user does not have a security right.

As aforementioned, in the security check methods and systems according to some example embodiments, a security check over a user is performed in the vehicle, and only a user having an entry right to a specific complex or building is allowed to get off, based on a result of the security check. In some example embodiments, a security check over a user may be performed while the user is moving by vehicle, and only a user having an entry right may be allowed to get off. This may allow the specific complex or building to omit a security check over the user who has got off the vehicle in some situations. Like this, in the security check methods and systems according to some example embodiments, as a security check over a user is performed in the vehicle, it may not be desired to provide additional workers and/or facilities for a user's security check at each specific complex or building. That is, according to some example embodiments, because a security check over a user is performed through the vehicle, security checks at a plurality of different complexes or buildings may be performed within the single vehicle. Accordingly, an efficiency of the security check may be improved with construction of a relatively light infrastructure for security check.

The aforementioned example embodiments may be executed by one or more processors in a computer, and may be implemented as a non-transitory computer-readable record medium storing a program.

Further, the aforementioned example embodiments can be implemented as a program-recorded medium storing a computer-readable code or instruction word. That is, the example embodiments may be provided in the form of a non-transitory computer-readable record medium storing a computer-readable code or instruction word.

The computer-readable medium includes all types of recording devices for storing data which can be read by a computer system. Examples of the computer-readable medium include a Hard Disk Drive (HDD), a Solid State Disk (SSD), a Silicon Disk Drive (SDD), ROM, RAM, CD-ROM, a magnetic tape, a floppy disk, an optical data storage device, etc.

Further, the computer-readable medium includes a storage unit which may be a server or a cloud storage unit to which an electronic device can access through communications. For example, a computer may download a program of the example from the server or the cloud storage unit, through wired or wireless communications.

Further, the aforementioned computer is an electronic device where a processor (e.g., a Central Processing Unit (CPU)) is mounted, and there is no limitation on a type of the computer.

Any functional blocks (e.g., "module" and/or "unit") shown in the figures and described above may be implemented in processing circuitry such as hardware including logic circuits, a hardware/software combination such as a processor executing software, or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The foregoing embodiments are merely examples and are not to be construed as limiting example embodiments of the present disclosure. The scope of example embodiments should be determined by reasonable interpretations of the appended claims, and all changes and modifications that fall within the metes and bounds of the claims, or equivalents of such metes and bounds are therefore intended to be embraced by the appended claims.

What is claimed is:

1. A security check method in an autonomous vehicle which is configured to run along a driving path including at least one destination, the method comprising:

checking an allowed security right for entry of the destination, the allowed security right being an entry right desired to enter the destination and set to at least one of a plurality of security types;

detecting a security right of a user on the autonomous vehicle, the security right being an entry right possessed by the user; and performing a security process related to getting off the autonomous vehicle, based on the security right of the user and the allowed security right, wherein the security process includes, in a first case where the security right of the user allows entry to the destination, controlling a door provided on the autonomous vehicle to be in an open state upon arrival of the autonomous vehicle at the destination, and in a second case where the security right of the user prohibits entry to the destination, controlling the door of the autonomous vehicle to remain in a closed state, even upon the arrival of the autonomous vehicle at the destination.

2. The method of claim 1, wherein the performing is performed only when the security right of the user does not satisfy the allowed security right.

3. The method of claim 2, wherein the performing is performed to restrict a specific user who is an object to get off among a plurality of users from getting off, according to whether the security right of the specific user satisfies the allowed security right.

4. The method of claim 3, further comprising:

controlling the door provided at the autonomous vehicle to be in an open state, based on arrival of the autonomous vehicle at the destination, in order to allow the specific user to get off when the security process has not been executed.

5. The method of claim 3, wherein the performing includes:

checking the security right of the specific user, based on arrival of the autonomous vehicle at the destination; and controlling the door of the autonomous vehicle to have an open state, in a case that the security right of the specific user enables entry to the destination based on a result of the checking the security right of the specific user.

6. The method of claim 5, wherein the checking the security right of the specific user includes:

sensing user information of the specific by a sensor provided at the autonomous vehicle; and checking the security right of the specific user based on the sensed user information.

7. The method of claim 5, wherein the performing includes controlling the door of the autonomous vehicle to be maintained at a closed state, in a case that the security right of the specific user prohibits entry to the destination based on the result of the checking the security right of the specific user.

8. The method of claim 7, wherein the performing includes providing guide information related to one or more destinations where the specific user desires to enter with the security right of the specific user, among destinations included in the driving path, on a display provided at the autonomous vehicle, in a case that the security right of the specific user prohibits entry to one of the one or more destinations based on the result of the checking the security right of the specific user.

9. The method of claim 7, wherein the performing includes controlling the open state of the door to be converted into the closed state, based on completion of getting-off of the specific user, regardless of an existence of another user who is an object to get off different from the specific user at the destination, and the performing includes controlling the open state or the closed state of the door, based on that the security right of the another user enables entry to the destination.

10. The method of claim 1, wherein the performing includes:
comparing the security right of the user with the allowed security right, and
performing the security process when a result of the comparing indicates that the security right of the user does not satisfy the allowed security right.

11. The method of claim 10, wherein the performing includes:
comparing the security right of the user with each of allowed security rights to a plurality of destinations in a case that the plurality of destinations are included in the driving path, and
performing the security process when the result of the comparing indicates that the security right of the user does not satisfy the allowed security right to at least one of the plurality of destinations.

12. The method of claim 1, wherein the detecting includes:
sensing a facial image of the user on the autonomous vehicle, by using at least one camera provided in the autonomous vehicle; and
detecting the security right of the user matched with the facial image, from a user database.

13. The method of claim 1, wherein the performing includes:
specifying a specific user who is an object to get off among a plurality of users, based on gestures of the users sensed by one or more cameras provided at the autonomous vehicle; and performing the security process when the security right of the specific user does not satisfy the allowed security right.

14. The method of claim 1, wherein the performing includes:
specifying one or more users having no intention to get off at the destination among a plurality of users based on gestures of the users sensed by one or more cameras provided at the autonomous vehicle, and
preventing the security process from being performed when a set of one or more users who do not satisfy the allowed security right, from among the users, are included in the specified one or more users.

15. The method of claim 1, wherein the performing includes,
specifying at least one user positioned within a region of the autonomous vehicle, among a plurality of users on the autonomous vehicle, as a specific user who is an object to get off, and
performing the security process when the specific user has the security right which does not satisfy the allowed security right, and
the region is near a door provided at the autonomous vehicle.

16. A security check system in an autonomous vehicle which is configured to run along a driving path including at least one destination, the system comprising:
a sensor configured to sense user information on a user on the autonomous vehicle; and
a controller configured to detect a security right of the user by using the user information, the security right being an entry right possessed by the user,
wherein the controller is further configured to perform a security process related to getting-off the autonomous vehicle, based on the security right of the user and an allowed security right for entry of the destination, the allowed security right being an entry right desired to enter the destination and set to at least one of a plurality of security types, and
wherein the security process includes, in a first case where the security right of the user allows entry to the destination, controlling a door provided on the autonomous vehicle to be in an open state upon arrival of the autonomous vehicle at the destination, and in a second case where the security right of the user prohibits entry to the destination, controlling the door of the autonomous vehicle to remain in a closed state, even upon the arrival of the autonomous vehicle at the destination.

17. An autonomous vehicle that is configured to run along a driving path including at least one destination, the autonomous vehicle comprising:
a door having one of an open state and a closed state;
a camera configured to capture an inner space of the autonomous vehicle; and
a controller configured to detect a facial image of a user on the autonomous vehicle from an image captured by the camera, and configured to detect a security right of the user matched with the facial image from a user database, the security right being an entry right possessed by the user,
wherein in a case that a specific user, from among a plurality of users, whose security right does not satisfy an allowed security right for entry of the destination exists, the controller is configured to perform a security process for restricting getting-off of the specific user by controlling an open or closed state of the door, the allowed security right being an entry right desired to enter the destination and set to at least one of a plurality of security types, and
wherein the security process includes, in a first case where the security right of the specific user allows entry to the destination, controlling a door provided on the autonomous vehicle to be in an open state upon arrival of the autonomous vehicle at the destination, and in a second case where the security right of the specific user prohibits entry to the destination, controlling the door of the autonomous vehicle to remain in a closed state, even upon the arrival of the autonomous vehicle at the destination.

18. The autonomous vehicle of claim 17, further comprising:
a transparent display having a light transmittance,
wherein in a case that the autonomous vehicle is running along the driving path near a specific destination where the specific user cannot access with the security right of the specific user, the controller is configured to change a light transmission degree of the transparent display.

19. A non-transitory computer-readable record medium storing a program thereon, which when executed by one or more processors, causes a computer to implement a security check method, the security check method comprising:
checking an allowed security right for entry of a destination included in a driving path of an autonomous vehicle, the allowed security right being an entry right desired to enter the destination and set to at least one of a plurality of security types;
detecting a security right of a user on the autonomous vehicle, the security right being an entry right possessed by the user; and
performing a security process related to getting-off the autonomous vehicle, based on the security right of the user and the allowed security right, wherein the security process includes, in a first case where the security right of the user allows entry to the destination, controlling a door provided on the autonomous vehicle to be in an open state upon arrival of the autonomous vehicle at the destination, and in a second case where the security right of the user prohibits entry to the destination, controlling the door of the autonomous vehicle to remain in a closed state, even upon the arrival of the autonomous vehicle at the destination.

* * * * *